(12) United States Patent
Hattori

(10) Patent No.: US 8,261,259 B2
(45) Date of Patent: Sep. 4, 2012

(54) DYNAMIC PRINTING SYSTEM, APPARATUS AND METHOD

(75) Inventor: Tomoki Hattori, Suwanee, GA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/411,105

(22) Filed: Mar. 2, 2012

(65) Prior Publication Data

US 2012/0162687 A1    Jun. 28, 2012

Related U.S. Application Data

(63) Continuation-in-part of application No. 11/713,125, filed on Mar. 1, 2007, now Pat. No. 8,185,887.

(51) Int. Cl.
*G06F 9/445* (2006.01)
(52) U.S. Cl. ............ 717/174; 708/173; D18/50; D18/54
(58) Field of Classification Search .................. 708/173; D18/50, 54
See application file for complete search history.

(56) References Cited

U.S. PATENT DOCUMENTS

| | | |
|---|---|---|
| 5,220,674 A | 6/1993 | Morgan et al. |
| 5,513,254 A | 4/1996 | Markowitz |
| 5,642,205 A | 6/1997 | Kassmann |
| 5,907,830 A | 5/1999 | Engel et al. |
| 5,909,673 A | 6/1999 | Gregory |
| 5,926,795 A | 7/1999 | Williams |
| 6,021,429 A | 2/2000 | Danknick |
| 6,075,971 A | 6/2000 | Williams et al. |
| 6,115,132 A | 9/2000 | Nakatsuma et al. |
| 6,118,546 A | 9/2000 | Sanchez et al. |
| 6,243,172 B1 | 6/2001 | Gauthier et al. |
| 6,313,921 B1 | 11/2001 | Kadowaki |
| 6,336,098 B1 | 1/2002 | Fortenberry et al. |
| 6,452,692 B1 | 9/2002 | Yacoub |
| 6,573,910 B1 | 6/2003 | Duke et al. |
| 6,591,297 B1 | 7/2003 | Challener et al. |
| 6,615,183 B1 | 9/2003 | Kolls |
| 6,668,376 B1 | 12/2003 | Wang et al. |
| 6,671,749 B2 | 12/2003 | Williams et al. |
| 6,681,392 B1 | 1/2004 | Henry et al. |
| 6,754,896 B2 | 6/2004 | Mishra et al. |
| 6,757,070 B1 | 6/2004 | Lin et al. |
| 6,762,771 B1 | 7/2004 | Niki et al. |
| 6,789,111 B1 | 9/2004 | Brockway et al. |

(Continued)

FOREIGN PATENT DOCUMENTS

JP    9-66649    3/1997

(Continued)

OTHER PUBLICATIONS

Nov. 5, 2010 European search report in connection with counterpart European patent application No. 07 25 1418.

(Continued)

*Primary Examiner* — Phillip H Nguyen
(74) *Attorney, Agent, or Firm* — Cooper & Dunham LLP

(57) ABSTRACT

Improved techniques which enable a user of a terminal to select a printer, without a priori knowledge of available printers, for printing a print job are provided. A map indicating locations of available printing devices is retrieved from a back-end server based on user information or other information retrieved from the user, and provided to the user terminal for user selection of an appropriate printing device.

16 Claims, 18 Drawing Sheets

U.S. PATENT DOCUMENTS

| | | | |
|---|---|---|---|
| 6,814,512 B2 | 11/2004 | Kato | |
| 6,825,941 B1 | 11/2004 | Nguyen et al. | |
| 6,915,337 B1 | 7/2005 | Motoyama et al. | |
| 6,947,995 B2 | 9/2005 | Chang et al. | |
| 6,952,831 B1 | 10/2005 | Moore | |
| 6,957,437 B1 | 10/2005 | Bogia et al. | |
| 6,959,437 B2 | 10/2005 | Schacht et al. | |
| 6,965,451 B1 * | 11/2005 | Ogg et al. | 358/1.8 |
| 6,965,931 B2 | 11/2005 | Helms | |
| 6,965,958 B1 | 11/2005 | Sugiyama | |
| 6,967,734 B1 | 11/2005 | Wang et al. | |
| 6,976,252 B2 | 12/2005 | White et al. | |
| 6,978,314 B2 | 12/2005 | Tarr | |
| 6,996,611 B1 | 2/2006 | Muto | |
| 7,099,937 B1 | 8/2006 | Ochiai et al. | |
| 7,190,467 B2 | 3/2007 | Simpson et al. | |
| 7,206,830 B2 | 4/2007 | Yamazaki | |
| 7,237,015 B1 | 6/2007 | Ochiai et al. | |
| RE39,801 E | 8/2007 | Marbry et al. | |
| 7,253,915 B2 * | 8/2007 | Kemp et al. | 358/1.15 |
| 7,324,233 B2 | 1/2008 | Shima et al. | |
| 7,327,482 B2 | 2/2008 | Ferlitsch | |
| 7,352,485 B2 | 4/2008 | Kinoshita | |
| 7,353,373 B2 | 4/2008 | Olbricht | |
| 7,370,090 B2 * | 5/2008 | Nakaoka et al. | 709/219 |
| 7,389,414 B2 | 6/2008 | Hibino et al. | |
| 7,424,532 B1 | 9/2008 | Subbiah | |
| 7,430,736 B2 | 9/2008 | Nguyen et al. | |
| 7,440,130 B2 | 10/2008 | Shima | |
| 7,461,375 B2 | 12/2008 | Kazumi et al. | |
| 7,519,697 B2 | 4/2009 | Matsukura | |
| 7,533,355 B2 | 5/2009 | Aritomi | |
| 7,552,432 B2 | 6/2009 | Aiba | |
| 7,640,554 B2 | 12/2009 | Yamade | |
| 7,656,547 B2 | 2/2010 | Kuo et al. | |
| 7,793,285 B2 | 9/2010 | Hattori et al. | |
| 8,014,025 B2 * | 9/2011 | Steele et al. | 358/1.9 |
| 8,121,958 B2 * | 2/2012 | Motoyama | 705/400 |
| 2001/0037390 A1 | 11/2001 | Kuroyanagi | |
| 2001/0046065 A1 | 11/2001 | Furukawa et al. | |
| 2002/0010806 A1 | 1/2002 | Yamade | |
| 2002/0046228 A1 | 4/2002 | Scheifler et al. | |
| 2002/0051178 A1 | 5/2002 | Nakayasu et al. | |
| 2002/0075509 A1 | 6/2002 | Wiechers | |
| 2002/0089691 A1 * | 7/2002 | Fertlitsch et al. | 358/1.15 |
| 2002/0178051 A1 | 11/2002 | Golden et al. | |
| 2003/0002078 A1 | 1/2003 | Toda et al. | |
| 2003/0005097 A1 | 1/2003 | Barnard et al. | |
| 2003/0053122 A1 | 3/2003 | Kinoshita | |
| 2003/0101342 A1 | 5/2003 | Hansen | |
| 2003/0120624 A1 | 6/2003 | Poppenga et al. | |
| 2004/0001217 A1 | 1/2004 | Wu | |
| 2004/0019671 A1 | 1/2004 | Metz | |
| 2004/0167974 A1 | 8/2004 | Bunn et al. | |
| 2004/0243572 A1 | 12/2004 | Muto | |
| 2005/0012951 A1 | 1/2005 | Madril et al. | |
| 2005/0128968 A1 | 6/2005 | Yang | |
| 2005/0180791 A1 | 8/2005 | Kujirai | |
| 2006/0221380 A1 | 10/2006 | Pretz et al. | |
| 2007/0024896 A1 | 2/2007 | Bounar | |
| 2007/0095906 A1 | 5/2007 | Camilleri et al. | |
| 2007/0127069 A1 | 6/2007 | Steele et al. | |
| 2007/0153317 A1 | 7/2007 | Klein | |
| 2007/0229891 A1 | 10/2007 | Yanagi et al. | |
| 2007/0229896 A1 | 10/2007 | Fujimori et al. | |
| 2007/0233834 A1 | 10/2007 | Hattori et al. | |
| 2007/0234354 A1 | 10/2007 | Hattori | |
| 2007/0245358 A1 | 10/2007 | Hattori et al. | |
| 2008/0231886 A1 | 9/2008 | Wehner et al. | |
| 2008/0235241 A1 | 9/2008 | Hattori et al. | |
| 2008/0243379 A1 | 10/2008 | Pearce | |
| 2009/0059272 A1 | 3/2009 | Matsushita et al. | |
| 2010/0253968 A1 * | 10/2010 | Nuggehalli | 358/1.15 |
| 2010/0328707 A1 * | 12/2010 | Miyake | 358/1.15 |
| 2011/0261391 A1 | 10/2011 | Oba et al. | |

FOREIGN PATENT DOCUMENTS

| | | |
|---|---|---|
| JP | 2001-282655 | 10/2001 |
| JP | 2004-240490 | 8/2004 |
| JP | 2005-190167 | 7/2005 |
| JP | 2005-228243 | 8/2005 |
| JP | 2006-65792 | 3/2006 |

OTHER PUBLICATIONS

May 24, 2011 European search report in connection with counterpart European patent application No. 07 25 1462.

Jun. 14, 2011 Japanese official action in connection with counterpart Japanese patent application No. 2007-095059.

Jun. 14, 2011 Japanese official action in connection with counterpart Japanese patent application No. 2007-095060.

HP Easy Printer Care Software, Version 1.0, Aug. 2005.

HP Web Jetadmin Report Generation Plug-in 3.0, 2005.

Koo et al., "Locationbased E-campus Web Servce: From Design to Deployment," 2003.

U.S. Appl. No. 13/312,392, filed Dec. 6, 2011.

* cited by examiner

Fig. 3
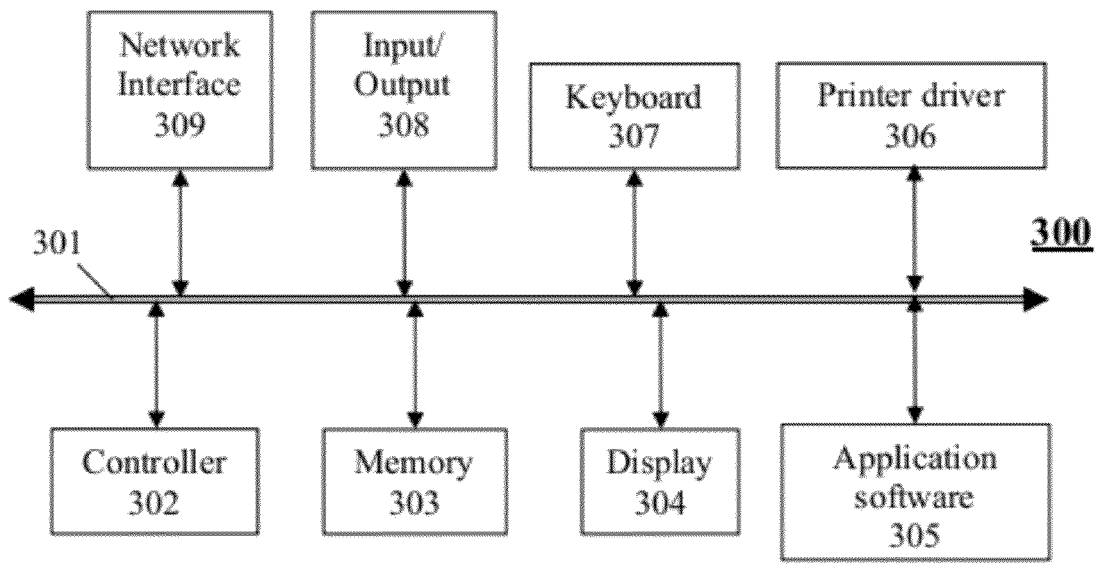
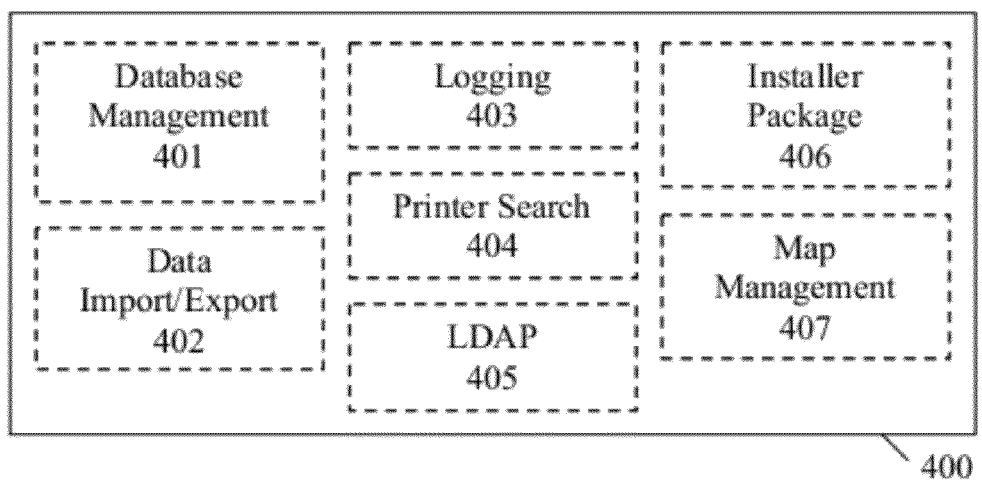
Fig. 4

| Printing |
| --- |

| Print | | Cancel |
| --- | --- | --- |

◉ Print to currently selected destination: Printer-RICOH: [192.168.100.100] Room 130
○ Select from the list Search here for printers:

| Keyword | ▶ |
| --- | --- |

Advanced Search | MAP | My Record

☐ DLS-PRTCLINICCOPY     Clinic Copy Room
☐ <u>DLS-PRTCLINICSTUDENT</u>     Clinic Student Area
☐ <u>DLS-PRTLIB1B</u>     Law Library 1st Floor Back
☐ <u>DLS-PRTLIB2B</u>     Law Library 2nd Floor Back
☐ <u>DLS-PRTLIB3B</u>     Law Library 3rd Floor Back
☐ <u>DLS-PRTLIB4B</u>     Law Library 4th Floor Back
☐ <u>DLS-PRTSTRECOUT</u>     Law School 2nd Floor Outside

Fig. 9A

DYNAMIC PRINTING SYSTEM, APPARATUS AND METHOD

CROSS-REFERENCE TO RELATED APPLICATION

This application is a continuation-in-part of U.S. patent application Ser. No. 11/713,125, filed Mar. 1, 2007 now U.S. Pat. No. 8,185,887 and entitled "SYSTEM AND METHOD FOR PRINTER DRIVER DISTRIBUTION WITH SEARCHABLE MAP DATABASE".

TECHNICAL FIELD

This disclosure relates to apparatuses, methodologies and systems for providing print services, and in particular, dynamically providing print services without a priori user knowledge of available print devices.

BACKGROUND

In the current information age, there are often discussions of the desirableness of a paperless society. However, notwithstanding such discussions, there remains a great need by users of computers and other terminal devices (including tablets and mobile phones) for printing functionality. Therefore, devices having printing functionality, such as printers, copiers, multi-function devices, etc., continue to play a significant role in information technology (IT) at home and at work.

A computer or information terminal typically needs printer driver software in order to communicate properly with a printing device, and a printer driver generally provides a software interface that allows the operating system and software applications running on the computer or other terminal devices to interface functionally with the printing device. For example, the printer driver software may match standardized commands from the computer's operating system to specific capabilities of the printing device.

Printing devices typically provide users with a plurality of print options, such as paper, tray, size, color, etc., which are accessible through user interfaces invoked by applications, and the task of providing such print options is performed by the printer driver software installed on the computer or other terminal devices. For example, conventional printer driver software may include a printer interface DLL (dynamic-link library, i.e. a collection of resources shared by other programs), as shown in FIG. 1A, to provide a user interface through which users can view and edit print options (e.g., configuration parameters of the printer driver).

The set of printing devices and functionalities available to a user can change over time because printing devices can be replaced or updated. In addition, the current trend is that more and more of the computers and other terminals devices which can access the peripherals are mobile. Therefore, the number and functionality of printing devices available to a user can vary depending on the location of the computer or terminal device used by the user at that moment.

As a result, the dynamic nature of modern-day printing environments makes it difficult for a user at a terminal (i.e. PC, tablet, mobile phone, etc.) to have prior knowledge of the printing devices that are available to the user at the moment when the user wishes to print a document.

However, conventional IT systems often do not provide a user-friendly system for a user at a terminal to find the appropriate or desired printer, particularly when the terminal has been moved from its usual location to a new or different location. For example, when a user invokes a print function, the user interface of the conventional system may display a preconfigured list of printers, as shown in FIG. 1B, and the user interface may allow the user to set basic print options. Further, other printer-specific options may be specified after the Properties button on the user interface screen is pressed, in the example shown in FIG. 1B.

However, the list of printers displayed in the print user interface is fixed, regardless of the location of the terminal, and is not dynamically updated to include newly added printers or exclude printers that have been moved elsewhere or removed from the network altogether. Thus, the user must have prior knowledge of the available printers (i.e. that such printers are available to the user, where the printers are located, what kinds of printers they are, and what kinds of settings are available on the printers) before selecting a printer for printing a document. Even with such prior knowledge, the user cannot be sure whether the list of printers displayed in the print user interface is up-to-date at the time of printing (i.e. whether the printers displayed still exist and whether additional printers have become available) because such a list of printers is static, and not maintained dynamically.

An improved approach for dynamically providing print services which allows a user to select an appropriate printer to which a print job can be sent is needed.

SUMMARY

This disclosure provides tools (in the form of apparatuses, methodologies and systems) that allow a user to select, without a priori knowledge of available print devices, a printer to which a print job can be sent.

In an aspect of this disclosure, a system for dynamically providing print services without a priori user knowledge of available print devices allows a user to select a print device from a map indicating locations of a plurality of print devices and sends a user-specified print job to the print device selected by the user.

In another aspect, a system for dynamically providing print services without a priori user knowledge of available print devices allows a user to specify basic print options through a user interface, and then retrieves a list of available print devices that support such basic print options.

In another aspect, a system for dynamically providing print services receives a print job from a user, retrieves from a back-end server a list of available print devices based on a location of the user, receives user selection of a specific print device from the list of available print devices, and sends the print job to the specific print device selected by the user.

In another aspect, in a system for dynamically providing print services, a device list query containing information regarding a user at a terminal is submitted to a back-end server, and a map or list of print devices compiled is retrieved based on the information contained in the device list query, and then displayed for user selection of a destination print device.

In another aspect, a system for dynamically providing print services without a priori user knowledge of available print devices, displays a print user interface containing a search field through which a user at a terminal may specify keyword terms, and retrieves and displays a map or list of print devices compiled based on the keyword terms, for user selection of a destination print device.

BRIEF DESCRIPTION OF THE DRAWINGS

The aforementioned and other features, aspects and advantages can be more readily understood from the following detailed description with reference to the accompanying drawings wherein:

FIG. 3 shows a block diagram of an exemplary configuration of a terminal shown in FIG. 2B-2E;

FIG. 4 shows a schematic representation of a web-based application, according to an exemplary embodiment;

FIG. 9A shows a print selection screen for selecting a printing device, in an exemplary embodiment.

DETAILED DESCRIPTION

Figure 1A:
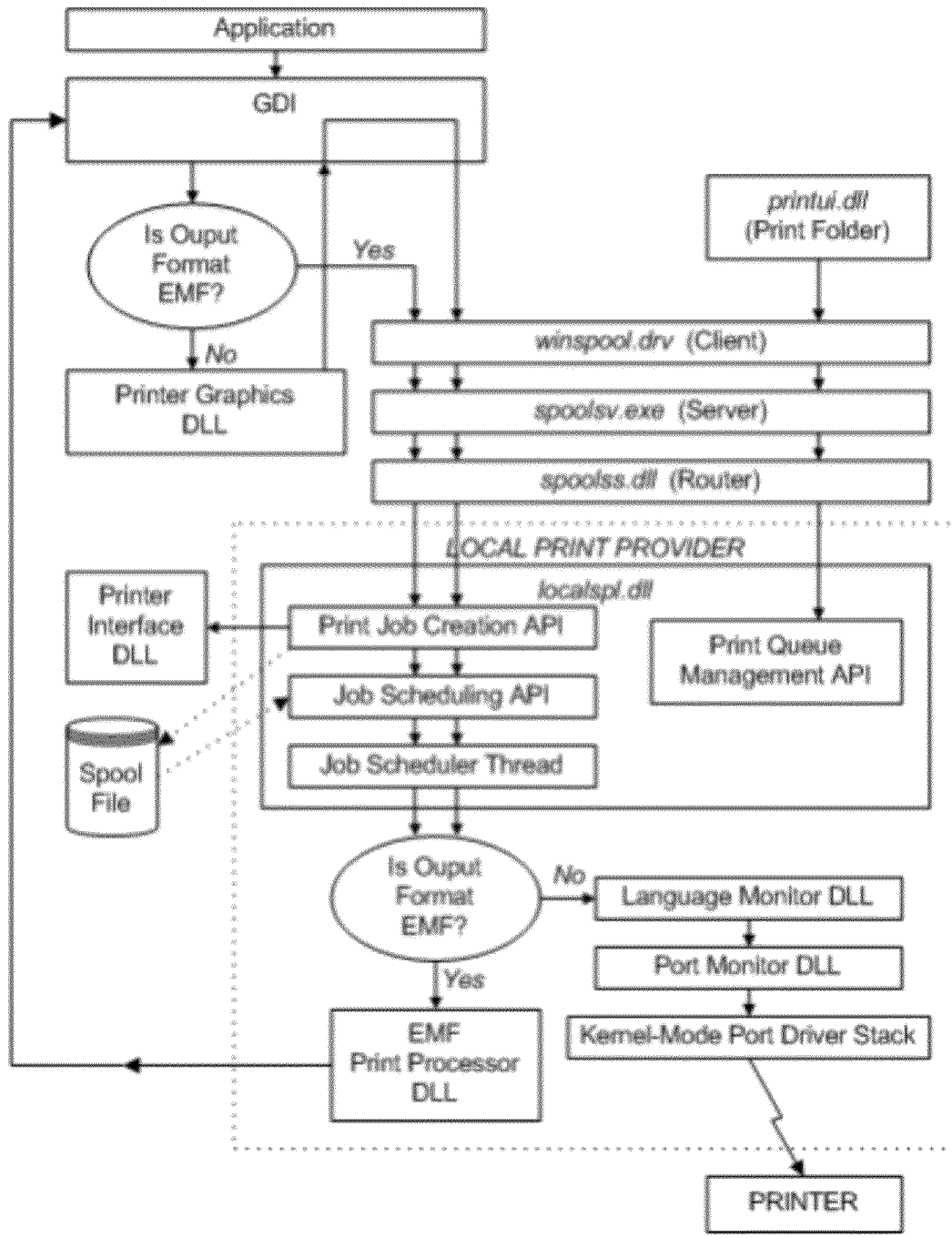
FIG. 1A shows a simplified view of control flow among components of a conventional printing system.
Figure 1B:
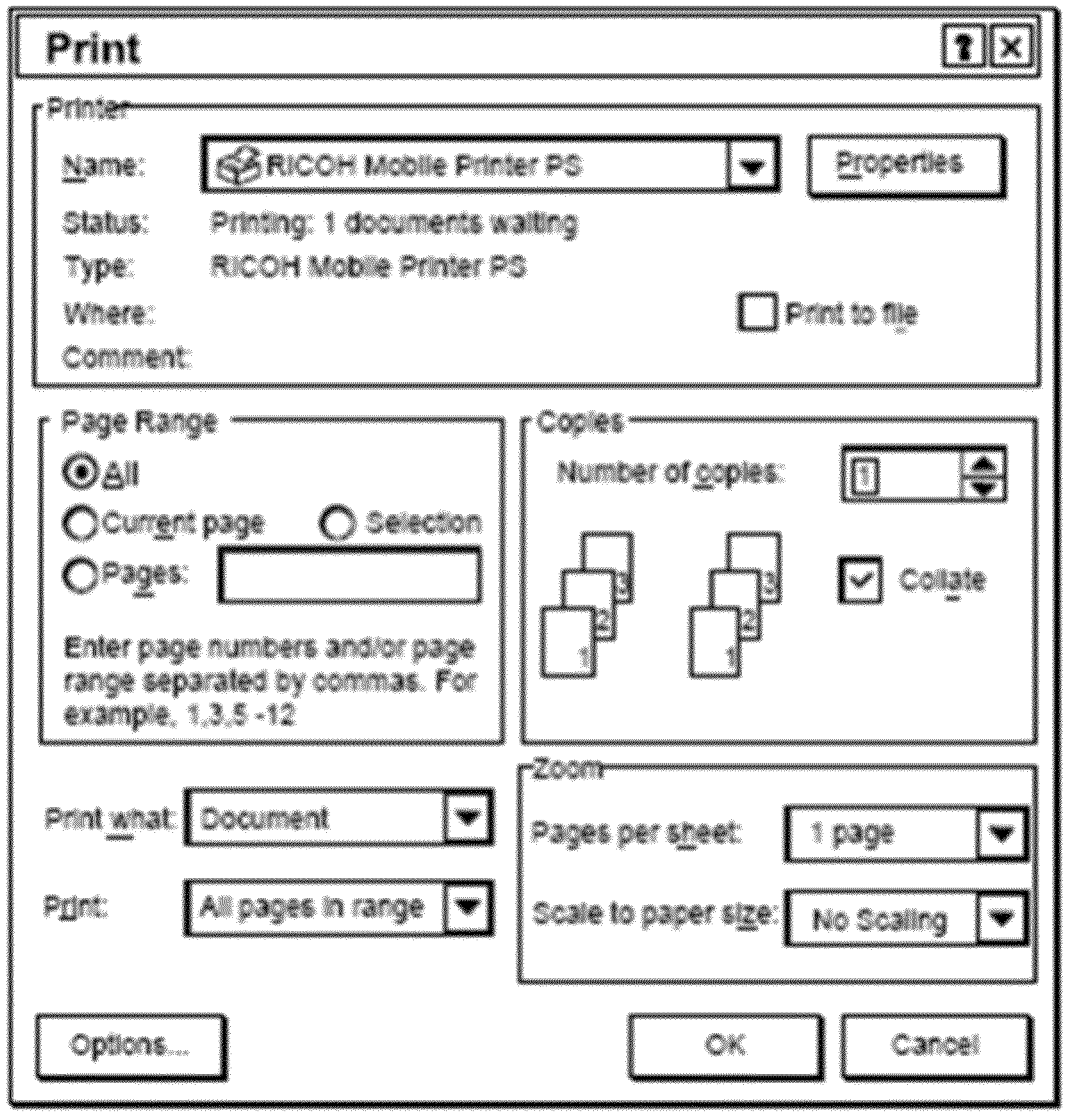
FIG. 1B shows a conventional user interface window provided by a driver or application for selecting a printer for printing a document.

In describing examples and exemplary embodiments illustrated in the drawings, specific terminology is employed for the sake of clarity. However, this disclosure is not intended to be limited to the specific terminology so selected, and it is to be understood that each specific element includes all technical equivalents that operate in a similar manner.

In this disclosure, tools are provided for dynamically providing print services without a priori user knowledge of available printers, by providing a map or list of available printers, and allowing a user to select an appropriate printer from the map or list of printers.

Referring now to the drawings, wherein like reference numerals designate identical or corresponding parts throughout the several views, a general workflow of a printing system, according to an exemplary embodiment, will now be discussed with reference to FIG. 2A.

Figure 2A:
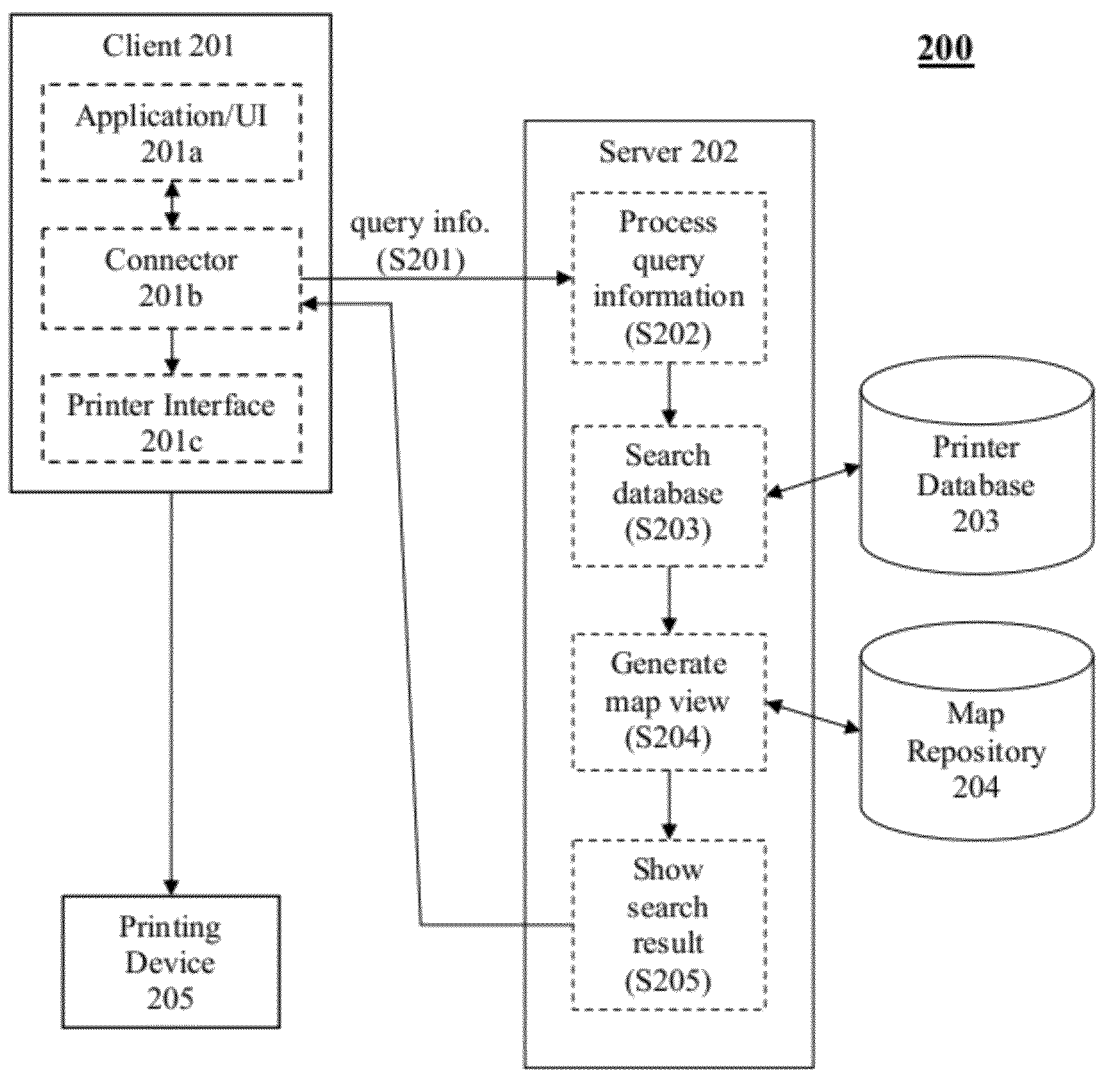
FIG. 2A shows a schematic diagram of a printing system, according to an exemplary embodiment.

In the exemplary embodiment shown in FIG. 2A, system 200 includes client 201, server 202, printer database 203, map repository 204 and printing device 205. In a typical workflow within the system, a user enters, via a print user interface or application 201a on the client terminal 201, selections of basic print options and/or a location on a map image provided by the user interface (as discussed infra), and submits the entered selections. The selections are processed by connector part 201b of the client 201 to formulate a query, and such query is output to server 202 (step S201). The server 202 processes the query (step S202) to extract the pertinent terms to search the printer database 203 (step S203). In the exemplary embodiment of FIG. 2A, location is one of the terms included in the query, and the server 202 utilizes the location term to formulate a request to the map repository 204 to retrieve an appropriate map image (step S204). Based on results from the search of the printer database 203 and the map image returned by the map repository 204, the server 202 generates a map indicating printers available to the user (step S205) and outputs such map information to the client 201. The connector part 201b of the client 201, which is configured to receive such map data from the server 202, forwards the received map data to the user interface 201a through which the map is presented to the user for user selection of a destination printer.

The printer database 203 stores printer properties information of a plurality of printers. For example, many printers store printer data, such as its attributes or printer properties information, in a Management Information Base (MIB). The MIB may conform to the SNMP (Simple Network Management Protocol) protocol, and printer properties information can be obtained from the MIB through SNMP queries. As another example, the printers on the network can be discovered by broadcast of SNMP messages over the network and then waiting for particular responses from printer devices.

The map repository 204 stores a plurality of map images which are retrieved by the server 202, and locations of the available printers are plotted on the retrieved map images.

The query information may include location information which may be used by the server 202 to determine which map images to retrieve from the map repository 204 and which of the available printers to plot on the map images. The user may manually specify a location (for example, a location on a map image, a specific location at which the user desires to locate an appropriate printer, etc.), or the client 201 may track its own location (for example, determined by a Global Positioning System receiver, or another location determining device) and provide such location information to the server 202. Alternatively, location information may be extrapolated from locations of routers, locations provided by wireless networks or other wireless technologies (such as RFID), etc.

Exemplary embodiments which build on the system 200 are described below with reference to the examples of FIGS. 2B-2E. In the following exemplary embodiments, the client 201 and the server 202 correspond to terminal devices and back-end servers of FIGS. 2B-2E, respectively.

Figure 2B:
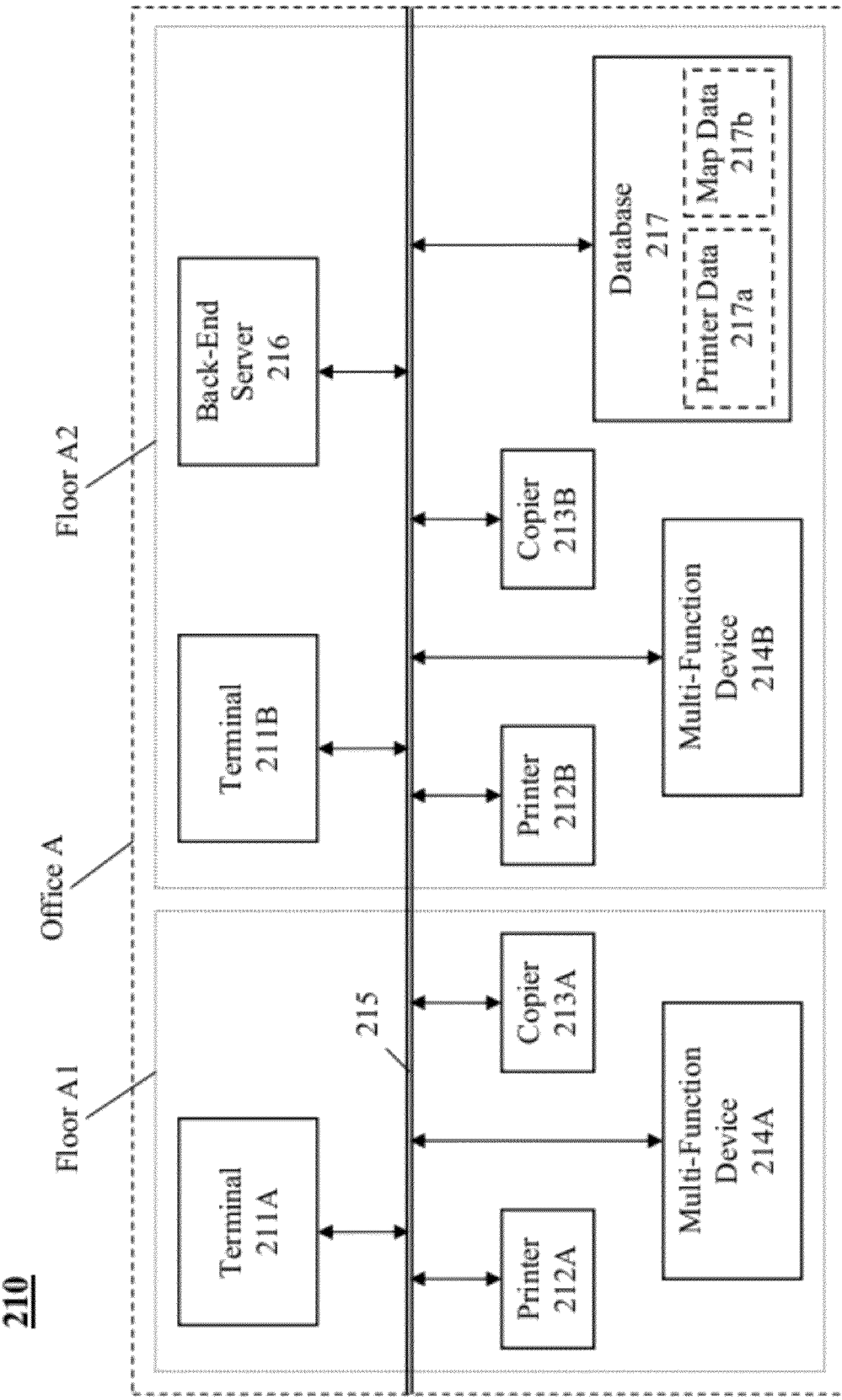
FIG. 2B shows a schematic diagram of a printing system, according to another exemplary embodiment.

FIG. 2B shows an example of a printing system in which terminals are interconnected with printing devices through a network connection. The example of FIG. 2B corresponds to an exemplary IT environment of an enterprise (for example, a corporation or other commercial enterprise, or another organization, such as a governmental agency, other public or private organizations, etc.).

In the example of FIG. 2B, office A includes multiple floors, including floor A1 and floor A2 (and can include many additional floors). On floor A1, a terminal 211A, a printer 212A, a copier 213A and a multi-function device 214A are interconnected through a network 215. Similarly, a terminal 211B, a printer 212B, a copier 213B and a multi-function device 214B, on floor A2, are interconnected through the network 215. Floor A2 further includes a back-end server 216 and a database 217.

The terminal 211A can access the printing devices on floor A2 (e.g., the printer 212B, the copier 213B and the multi-function device 214B), as well as the printing devices on floor A1 (e.g., the printer 212A, the copier 213A and the multi-function device 214A). Similarly, the terminal 211B can access the printing devices on floor A1 (e.g., the printer 212A, the copier 213A and the multi-function device 214A), as well as the printing devices on floor A2 (e.g., the printer 212B, the copier 213B and the multi-function device 214B).

Office A can include many more terminals and printing devices, other than those shown in FIG. 2B. Indeed, the printing system of this disclosure is preferably configured to be scalable such that terminals (and printing devices) can be added to the system as desired and needed.

The terminals 211A and 211B (which correspond to the client 201 shown in FIG. 2A) can be any computing device, including but not limited to a personal, notebook or workstation computer, a tablet (e.g., iPad), a kiosk, a personal digital assistant (PDA), a mobile phone or handset, another terminal, etc., that can communicate with other printing devices through the network 215. An exemplary configuration of the terminals 211A and 211B is further described infra with reference to the example of FIG. 3.

The network 215 can be a local area network, a wide area network or any type of network such as an intranet, an extranet (for example, to provide controlled access to external users, for example through the Internet), the Internet, etc., or a combination thereof. Further, other communications links (such as a virtual private network, a wireless link, etc.) may be used as well for the network 215. In addition, the network 215 preferably uses TCP/IP (Transmission Control Protocol/Internet Protocol), but other protocols can also be used. How devices can connect to and communicate over the network 215 is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

The back-end server 216 (which corresponds to the server 202 of FIG. 2A) may maintain, via the database 217, printer data 217a for the printing devices connected via the network 215 (i.e. the printer 212A, copier 213A, multi-function device 214A, printer 212B, copier 213B and multi-function device 214B), and map data 217b which include a plurality of map images used for creating a map of available printing devices. The printer data 217a and the map data 217b are stored in the database 217. For example, the printer data 217a may include a list of printing devices available on the network 215, detailed information regarding each printing device, and a printer driver corresponding to each printing device. The map data 217b may include text-based location information, regional maps, campus maps, and floor maps that may be utilized to find and plot available printing devices.

The terminals 211A and 211B may access the back-end server 216 via printer interface DLLs (which is described in the Background section of the present disclosure) or port monitors.

A port monitor, as shown in FIG. 1A, provides a communication path between a user-mode print spooler and a kernel-mode port driver stack that accesses the port hardware. The print spooler stores print jobs and sends them to the port monitor when they are ready for printing. The port driver stack receives from the port monitor information regarding the network address of the destination printer and the type of the port to which the destination printer is connected, and accesses the port hardware to transmit the print job to the destination printer.

A printer interface DLL (via a connector service/application, a component which provides a communication link between the printer interface DLL and the back-end server 216) or a port monitor of the terminal 211A or 211B submits a query to the back-end server 216 (for example, by accessing a predetermined network address of the back-end server 216, such as "http://back-end/interface.html" with user ID and password) for a map indicating locations of a plurality of printers that are available on the network 215. In response, the back-end server 216 accesses the database 217, retrieves the printer data 217a and map data 217b stored in the database 217, and relays the relevant printer information to the user terminal (i.e. terminal 211A or 211B) from which the query originated. A user at the user terminal may then select a destination printer from the map of available printers. In another embodiment, instead of a map, the back-end server 216 may return a list of available printers from which the user may select a destination printer.

The port monitor preferably accesses the back-end server 216 to retrieve a map or list of available printers only in a case that the print job received by the port monitor does not contain information regarding the destination printer (i.e. the printer interface DLL did not access, via a connector service/application, the back-end server 216 and allow the user to select a destination printer).

An exemplary configuration of the back-end server 216 is further discussed infra with reference to the example of FIG. 4.

Although the back-end server 216 and the database 217 are shown to be separate units on floor A2 of Office A in the example of FIG. 2B, the system 210 is not limited to such configuration, and the back-end server 216 and the device 217 may be located elsewhere and also be combined in a single device or implemented as software.

Although the enterprise environment of FIG. 2B is explained supra as an example of an IT environment in which the subject matter of this disclosure can be applied, it should be appreciated that the subject matter of this disclosure can also be applied in other network printing environments in which a plurality of printing devices are available for printing from a terminal.

Another exemplary configuration of a printing system is discussed below with reference to the example of FIG. 2C.

Figure 2C:
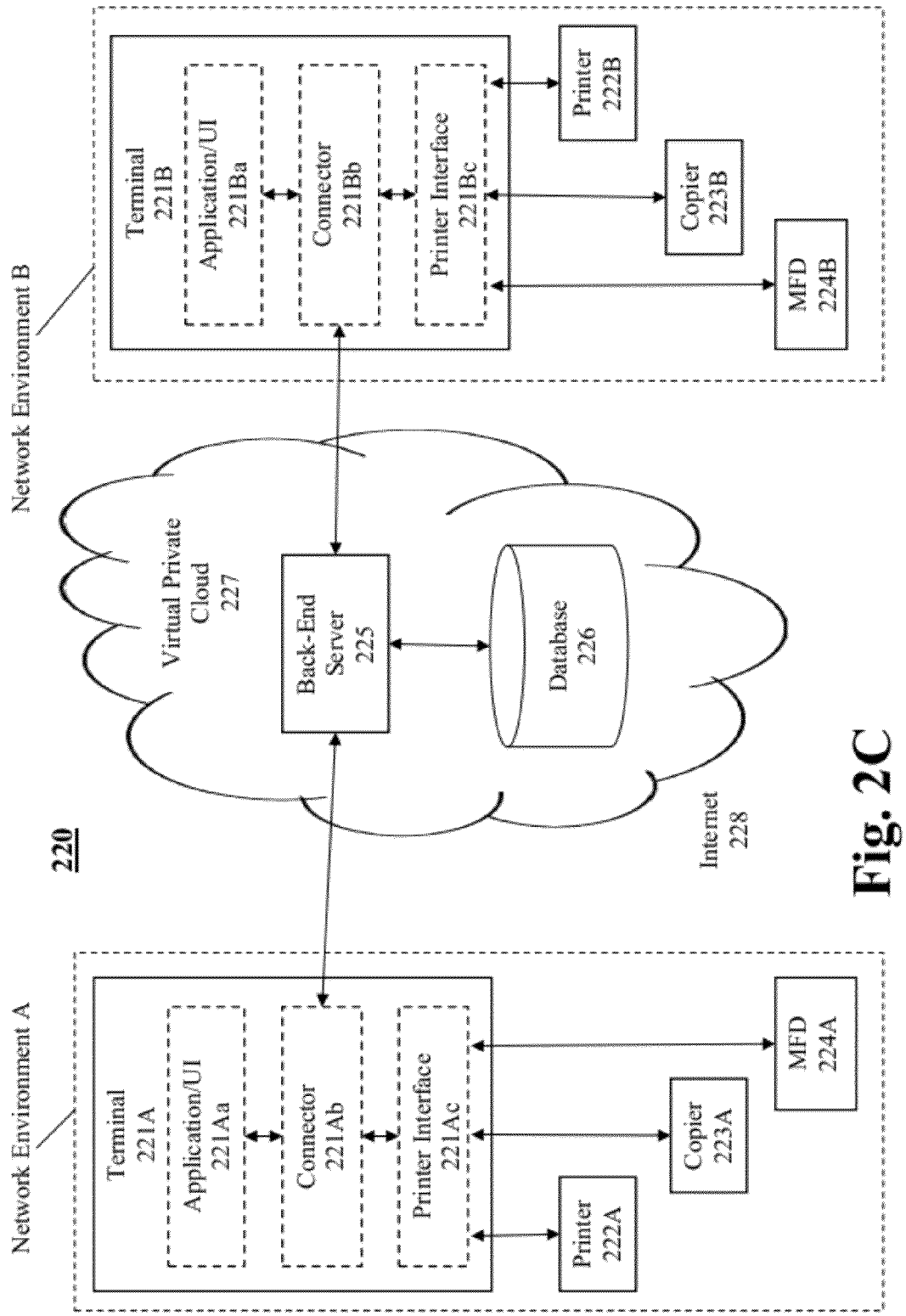
FIG. 2C shows a schematic diagram of a printing system, according to another exemplary embodiment.

In FIG. 2C, system 220 includes a terminal 221A, which is interconnected with a printer 222A, a copier 223A and a multi-function device 224A in a network environment A, and a terminal 221B, which is interconnected with a printer 222B, a copier 223B and a multi-function device 224B in a network environment B. In addition, the system 220 includes a back-end server 225 and a database 226 which are accessible through a virtual private cloud 227.

The terminal 211A includes an application/UI 221Aa, a connector 221Ab and a printer interface 221Ac. Similarly, the terminal 221B includes an application/UI 221Ba, a connector 221Bb and a printer interface 221Bc.

The terminals 221A and 221B interact with the back-end server 225 through the connectors 221Ab and 221Bb via a virtual private network, which in part includes the Internet 228, and interact with the printing devices (i.e. the printers 222A and 222B, the copiers 223A and 223B, and the multi-function devices 224A and 224B) via the printer interfaces 221Ac and 221Bc.

The application/UI allows the connector to communicate with a user at the terminals 221A and 221B. The connector is a component which provides a communication link between the printer interface and the back-end server 225. The printer interface allows the terminals 221A and 221B to communicate with a printing device (i.e. the printers 222A and 222B, the copiers 223A and 223B, and the multi-function devices 224A and 224B).

The virtual private cloud 227 is a private cloud existing within a shared or public cloud. The resources allocated to the virtual private cloud 227 are not accessible by the public.

For example, each of the network environments A and B may be an office of an enterprise. IT components of each of the offices are interconnected by a network within the network environments A and B, respectively. Each of the network environments A and B can include one or a combination of wired or wireless networks. The network environments A and B (as well as possibly other networks) jointly constitute an enterprise network (not identified in FIG. 2C).

It should be understood that the offices of the enterprises need not be geographically near each other. Thus, the offices can be in different continents, countries, states, districts, cities or towns (or on the other hand, they can be adjacent to each other). However, the subject matter of this disclosure provides a user with a user interface including a map or list of printing resources proximate to a particular geographical location (e.g., the location of the user terminal, which does not necessarily have a fixed location, from which a user is submitting a print job). Thus, the user can select an appropriate or desired printer to which the print job is to be sent, regardless of whether the user is at the user's home office, or at an office the user is visiting.

The operations of the back-end server 225 and the database 226 are otherwise similar to that described in connection with the system 210 of FIG. 2B.

Another exemplary configuration of a printing system is discussed below with reference to the example of FIG. 2D.

Figure 2D:
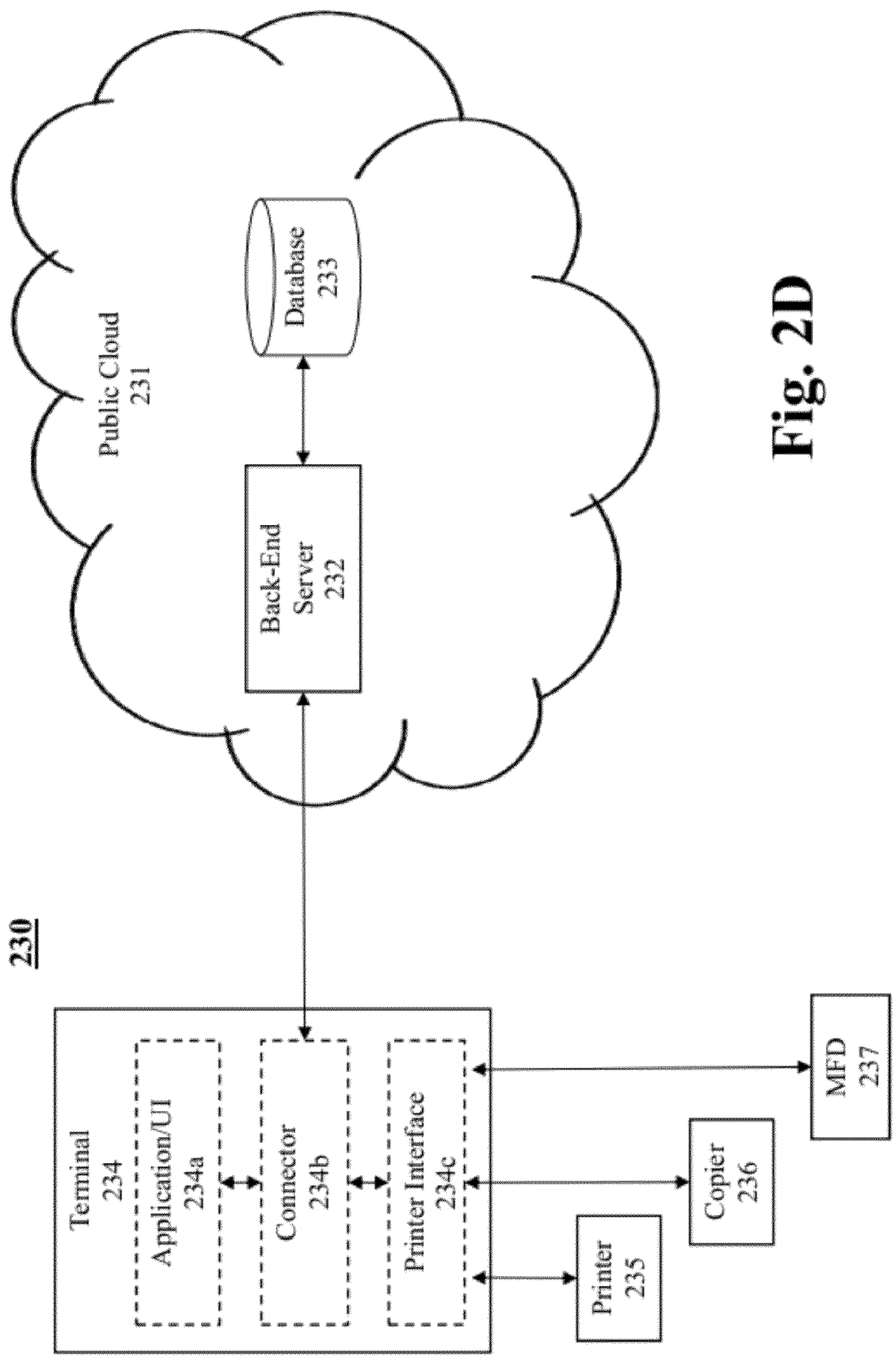
FIG. 2D shows a schematic diagram of a printing system, according to another exemplary embodiment.

In FIG. 2D, system 230 includes a back-end server 232, a database 233 which are accessible through public cloud 231. The system 230 further includes a terminal 234 (which includes an application/UI 234a, a connector 234b and a printer interface 234c), a printer 235, a copier 236 and a multi-function device 237.

The application/UI 234a allows the connector 234b to communicate with a user at the terminal 234. The connector 234b is a component which provides a communication link between the printer interface 234c and the back-end server 232. The printer interface 234c allows the terminal 234 to communicate with a printing device (i.e. the printer 235, the copier 236 and the multi-function device 237).

The terminal 234 communicates with the back-end server 232 through the connector 234b via the Internet through the public cloud 231.

A public cloud (e.g., the public cloud 231) allows the general public to access certain resources (e.g., applications and storage) over the Internet. That is, dynamic print services provided by the system 230 are accessible to the general public through various terminal devices (e.g., PC, tablet or mobile phone) via the Internet.

For example, the back-end server 232 maintains a list of publicly available printing devices (as opposed to the back-end server 216 of FIG. 2B, which only maintains printing devices within the network 215), and returns a map or list of such printing devices for user selection, in response to a device list query submitted by the user terminal 234 of FIG. 2D.

In another exemplary embodiment, a map service website that maintains a dynamic list of the locations of all printing devices available to the general public may be utilized to draw a map of available printers that are located near the terminal 234 from which the user is submitting a print request.

The operations of the back-end server 232 and the database 233 are otherwise similar to that described in connection with the system 210 of FIG. 2B.

Another exemplary configuration of a printing system is discussed below with reference to the example of FIG. 2E.

Figure 2E:
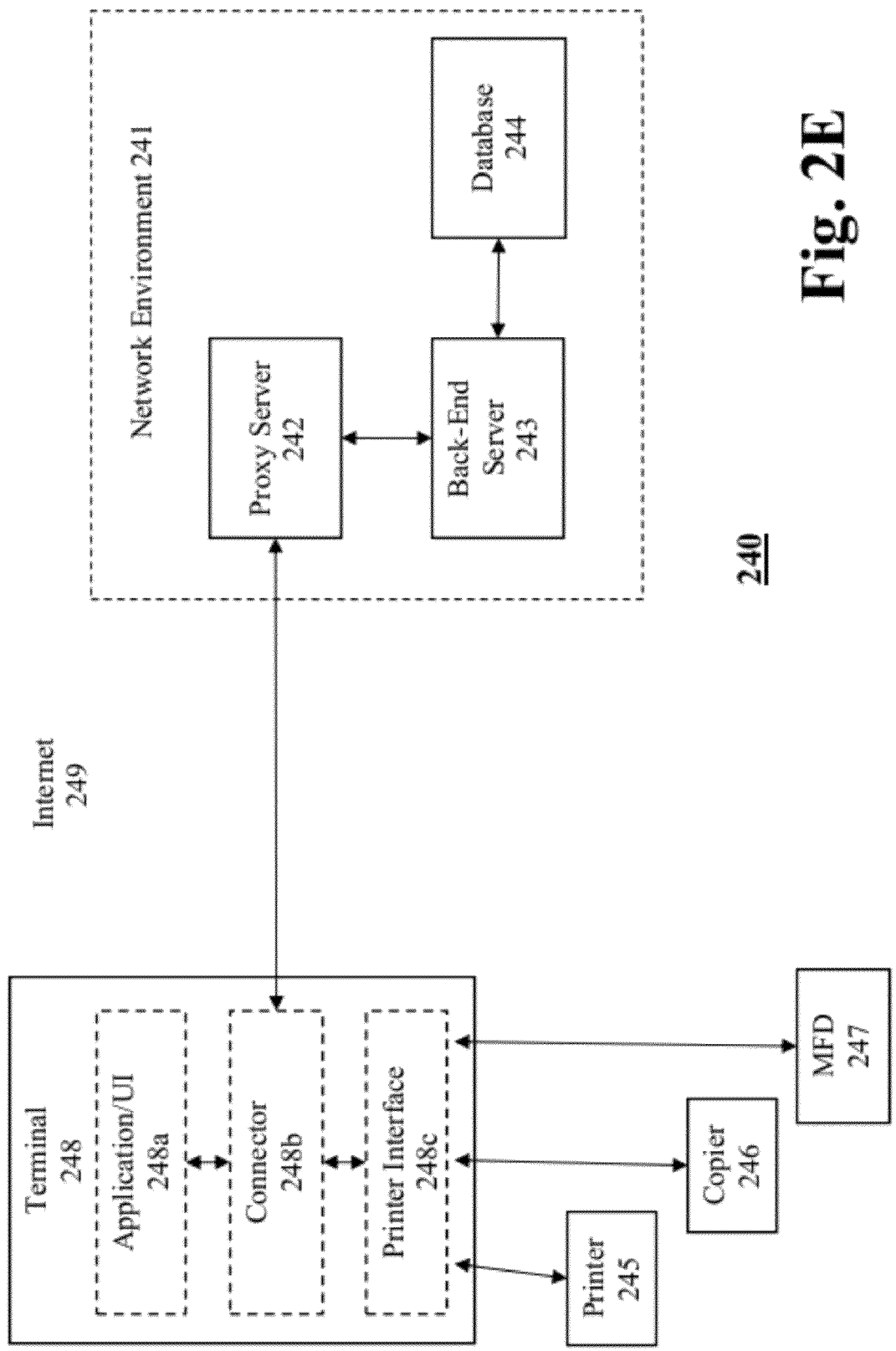
FIG. 2E shows a schematic diagram of a printing system, according to another exemplary embodiment.

In FIG. 2E, system 240 includes a proxy server 242, a back-end server 243 and a database 244, all of which are interconnected by a network within the network environment 241.

The system 240 also includes a printer 245, a copier 246, a multi-function device 247 and a terminal 248 (which includes an application/UI 248a, a connector 248b and a printer interface 248c).

The application/UI 248a allows the connector 248b to communicate with a user at the terminal 248. The connector 248b is a component which provides a communication link between the printer interface 248c and the back-end server 242. The printer interface 248c allows the terminal 248 to communicate with a printing device (i.e. the printer 245, the copier 246 and the multi-function device 247).

The terminal 248 communicates, via the connector 248b, with the proxy server 242 at least in part through the Internet 249.

The proxy server 242 serves as a gateway to the network environment 241 and allows a user to access resources in the otherwise private network environment 241. In the system 240 of FIG. 2E, the terminal 248 might access the back-end server 243 by using a proxy server address (e.g., along with proxy user ID and password).

The operations of the back-end server 243 and the database 244 are otherwise similar to that described in connection with the system 210 of FIG. 2B.

An exemplary configuration of the user terminals shown in FIGS. 2B-2E (for example, as a computer) is shown schematically in FIG. 3. In FIG. 3, computer 300 includes a controller (or central processing unit) 302 that communicates with a number of other components, including memory 303, display 304, application software 305, print driver 306, keyboard (and/or keypad) 307, other input/output (such as mouse, touchpad, stylus, microphone and/or speaker with voice/speech interface and/or recognition software, etc.) 308 and network interface 309, by way of an internal bus 301.

The memory 303 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 309 provides a connection (for example, by way of an Ethernet connection or other network connection which supports any desired network protocol such as, but not limited to TCP/IP, IPX, IPX/SPX, or NetBEUI) to network 21.

Print driver 306 and application software 305 are shown as components connected to the internal bus 301, but in practice are typically stored in storage media such as a hard disk or portable media, and/or received through the network 19, and loaded into memory 303 as the need arises.

Depending on the type of the particular terminal device, one or more of the components shown in FIG. 3 may be missing. For example, a particular mobile phone may be missing the print driver 306 and the keyboard 307.

The computer/terminal 300 may be configured (such as through the print driver 306 or application 305) to have a plurality of print modes, such as PDL mode, image mode, etc. In the PDL mode, the terminal communicates a print job to the printing device by utilizing a page description language (PDL) (for example, PostScript, etc.) and including one or more commands (for example, PCL, PJL, etc.), in a format which can be processed by the printing device. In image mode, the information terminal converts the print job into bitmap data and transmits the bitmap data to the printer device. In any event, the print job is communicated from the terminal via one or more packets through the network. Each packet includes in its header the network address (for example, IP address, Mac address, etc.) of the sending terminal.

Additional aspects or components of the computer 300 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Management of the back-end server (e.g., the back-end servers of FIGS. 2B-2E), which communicates with a database storing map images and information regarding a plurality of printing devices, can be provided as a web service, and an example thereof will now be discussed with reference to FIG. 4.

A web service 400 can include a database management component 401, data import/export component 402, logging component 403, printer search component 404, an LDAP component 405, installer package component 406 and a map management 407. The database management component 401 maintains data in the printer database, including deleting, searching and updating data in the database. In addition, the database management component 401 can, periodically or when necessary, connect to external databases to obtain updated data, for example, through ODBC (Open Data Base Connectivity). The data import/export component 402 allows a user (for example, system administrator) to import a data file (for example, a CSV file) and save the data in the file to the database, and may also allow the user to export data from the database. The logging component 403 automatically logs activity on the system, such as change to the database, driver download, invocation of the installation application, invocation of configuration and management tools, etc. The printer search component 404 searches the network for printers, using, for example, Simple Network Management Protocol (SNMP). The LDAP component 405 is provided for communications with an external printer management system, such as by Lightweight Directory Access Protocol (LDAP) with the server of such a system, or to access an active directory. The installer package component 406, upon request, loads a printer driver configuration and creates an installer of the printer driver. The installer and driver information are packaged for download to the information terminal. The map management component 407 searches a map repository for appropriate map image based on location information. In addition, as mentioned supra, the map management component 407 can communicate through ODBC or a Web service with external map databases.

Some methods which may be used, for example, with the systems of FIGS. 2A-2E, are described below with reference to FIGS. 5 through 9.

A method for dynamically providing print services, according to an exemplary embodiment, is discussed below with reference to the example of FIG. 5.

Figure 5:
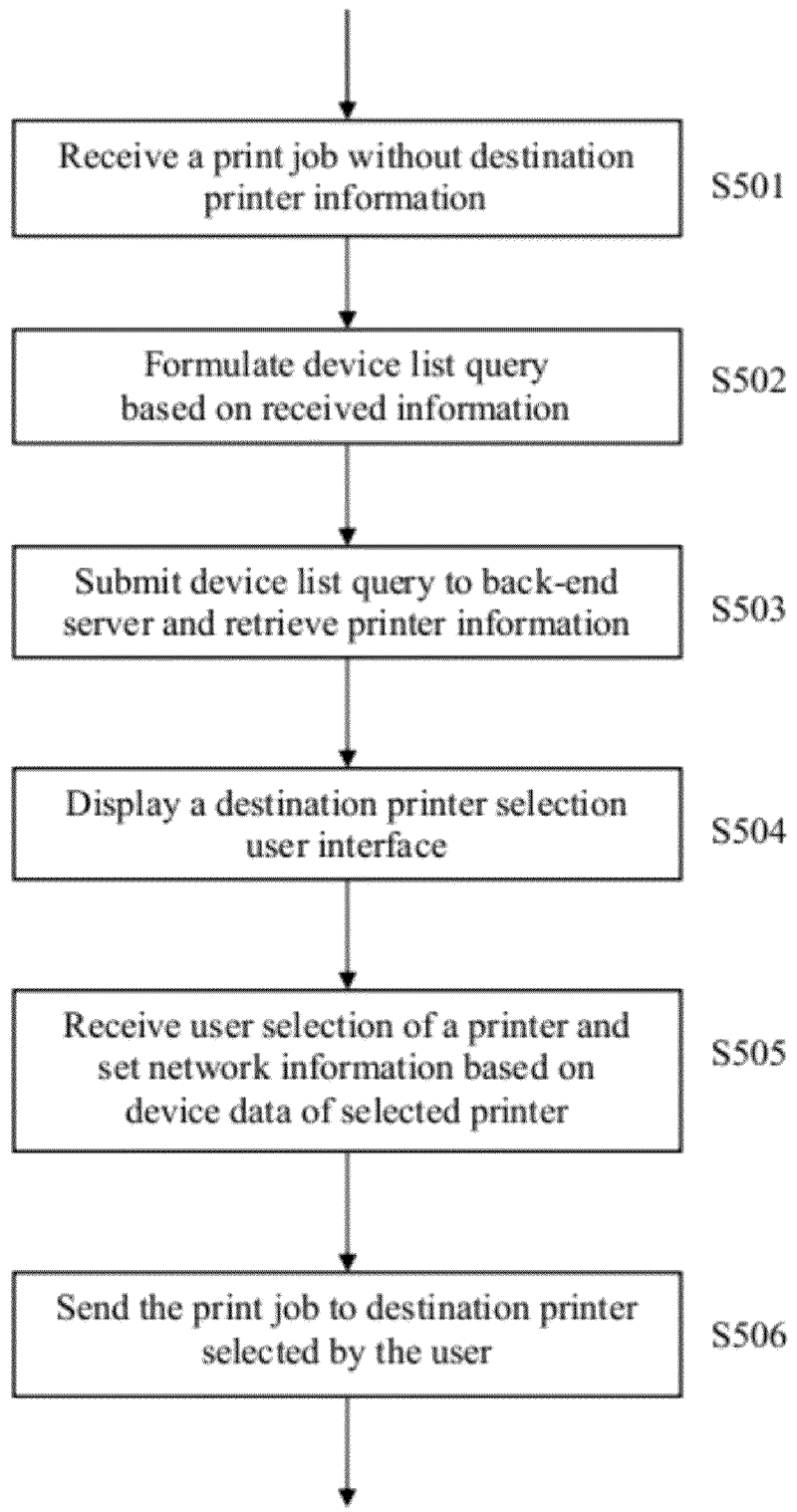
FIG. 5 shows a flow chart of a method for dynamically providing print services, according to an exemplary embodiment.
Figure 7A:
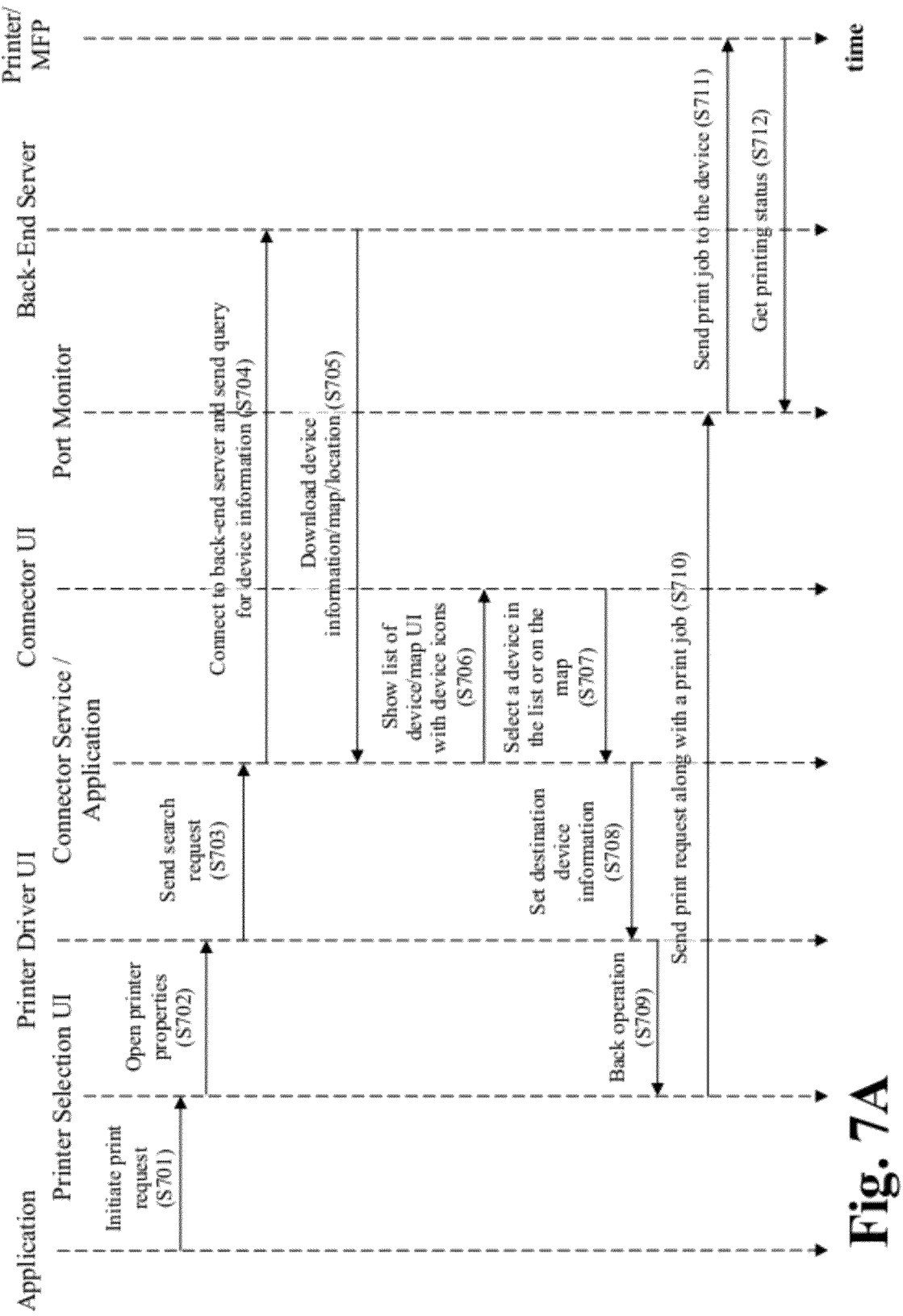
FIG. 7A shows a schematic representation of a workflow within the system of FIG. 6A, in an exemplary embodiment.
Figure 7B:
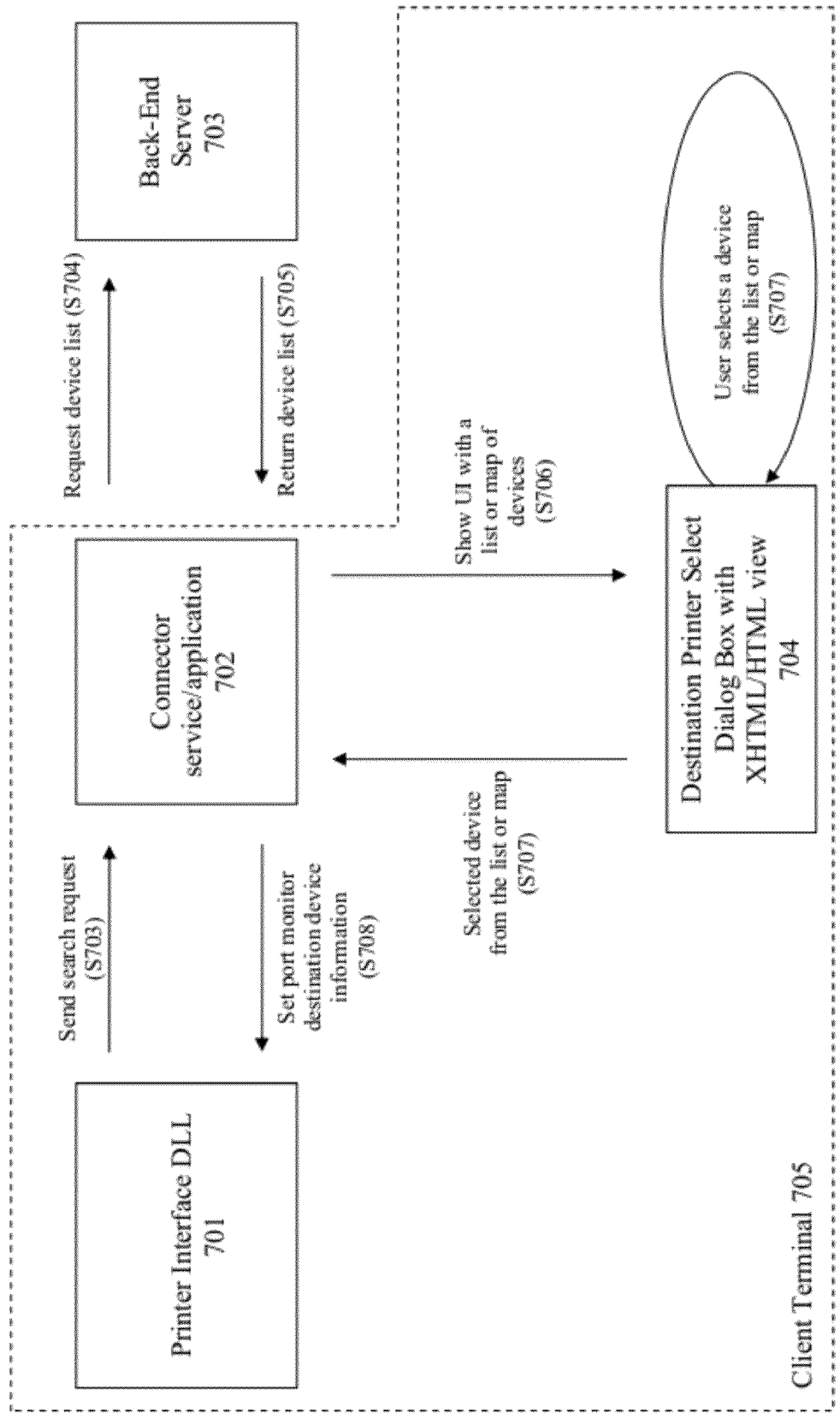
FIG. 7B shows a block diagram illustrating a workflow within the system of FIG. 6A, according to an exemplary embodiment.

Although the steps of FIG. 5 are described as being performed by a port monitor (previously discussed in connection with the system of FIG. 2B), similar steps may be carried out by a connector service/application (at the request of a printer interface DLL) shown in FIG. 7B.

First, a user invokes a print function from an application running on a terminal (e.g., by clicking on a print button) without specifying a destination printer to which the print job is to be sent, for example, via a universal printer driver.

A universal printer driver is a printer driver that relies on the standard languages of printers rather than one that is coded specifically for a particular model of printer. The universal printer driver maybe used over a network for computer systems that do not use a standard operating system, where it would be inconvenient for the network administrator to configure specific settings for each machine. Instead, the universal printer driver can be installed on each machine to facilitate the printing process.

For example, a printing system may allow basic print settings to be specified through a printer selection user interface via the universal printer driver, and allow additional printer-specific settings to be specified once a destination printer is selected. The printer driver for the selected destination printer may already be installed on the user terminal or may be downloaded and installed from a server (e.g., the back-end server discussed herein in connection with FIGS. 2B-2E and 4).

In a case that the print job is submitted by the application without a specified destination printer, the port monitor receives the print job (step S501), and recognizing that a destination printer has not been specified, formulates a device list query to be submitted to a back-end server (step S502). The device list query may include a variety of information regarding the user submitting the print job. For example, the device list query may include information regarding the location of the user terminal from which the user submitted the print job, and such location information maybe used to filter the list of available printers returned by the back-end server. Also, the device list query may include the basic print options specified by the user through the printer selection user interface via the universal printer driver, and the back-end server may only return information regarding printers that support such print options. Further, the device list query may include login credentials (e.g. user ID and password) of the user for determining which printers the user has access to from the plurality of printers available through the back-end server.

The device list query may be submitted to the back-end server using HyperText Transfer Protocol (HTTP), HyperText Transfer Protocol Secure (HTTPS), Simple Object Access Protocol (SOAP) or representational state transfer (REST).

The formulated device list query is submitted to the back-end server, and the back-end server returns a map or list of available printers drawn or compiled based on the information provided in the device list query (step S503). The returned device map/list may be, for example, in Extensible HyperText Markup Language (XHTML), HyperText Markup Language (HTML), Extensible Markup Language (XML), Cascading Style Sheets (CSS), an image format, or any combination thereof.

After retrieving the device map/list, the port monitor displays a destination printer selection dialog box through a user interface to the user terminal (step S504). The destination printer selection dialog box may be displayed in an XHTML or HTML viewer.

Figure 9B:
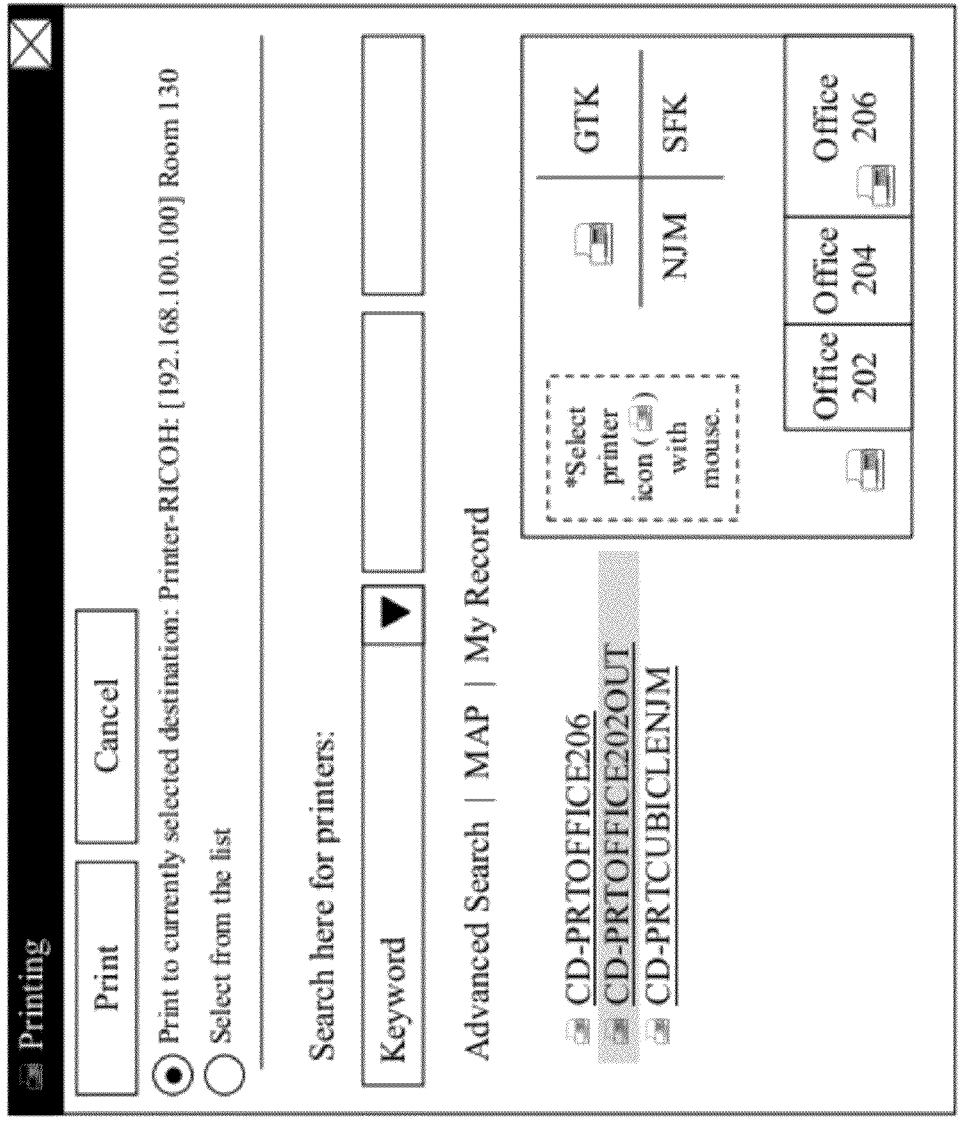
FIG. 9B shows a print selection screen for selecting a printing device, in another exemplary embodiment.

The destination printer selection dialog box may, for example, display the printers and the corresponding information in a list format, as shown in FIG. 9A. The drop-down menu (where it currently says "Keyword") can be used to search the printer database by keyword (as shown in FIG. 9A), location, available settings or any other relevant criteria. The user may click on the link that says "Advanced Search" in order to specify more detailed search criteria. The link that says "MAP" may display the available printers in a map and allow the user to select a printer by clicking on the map (e.g. as shown in FIG. 9B). The link that says "My Record" may display a history of printer usage by the particular user.

The destination printer selection dialog box can also display the printers on a map, for example, with printer icons indicating the locations of the printers, as shown in FIG. 9B. The map maybe retrieved from the back-end server or drawn based on printer location information and map images retrieved from the back-end server. The map may also be drawn based on the location information of the available printers retrieved from the back-end server and a map retrieved from a generic map service, such as Google Maps. The map preferably indicates where the user is located. The map may also indicate how far the printers are located from the user depending on the situation. For example, if the user is selecting a printer from the numerous printers on the same floor of an office, the distance information may not be as crucial as in a case where the user is looking for a public printer on a random street in Manhattan. The map may also include zoom-in/zoom-out and other functionalities to improve user experience.

The examples shown in FIGS. 9A and 9B are mere examples, and buttons, fields and other options and features may be added or removed to create many different configurations of a screen for selecting a destination printer.

Upon selecting a destination printer, the user may be able to specify additional settings such as image resolution or tray that may not have been available via the universal printer driver.

After the user selection of a destination printer is received, the port monitor sets network information based on device data of the destination printer retrieved from the back-end server (step S505). Based on the network information, the port monitor sends the print job to the destination printer selected by the user (step S506).

Figure 6A:
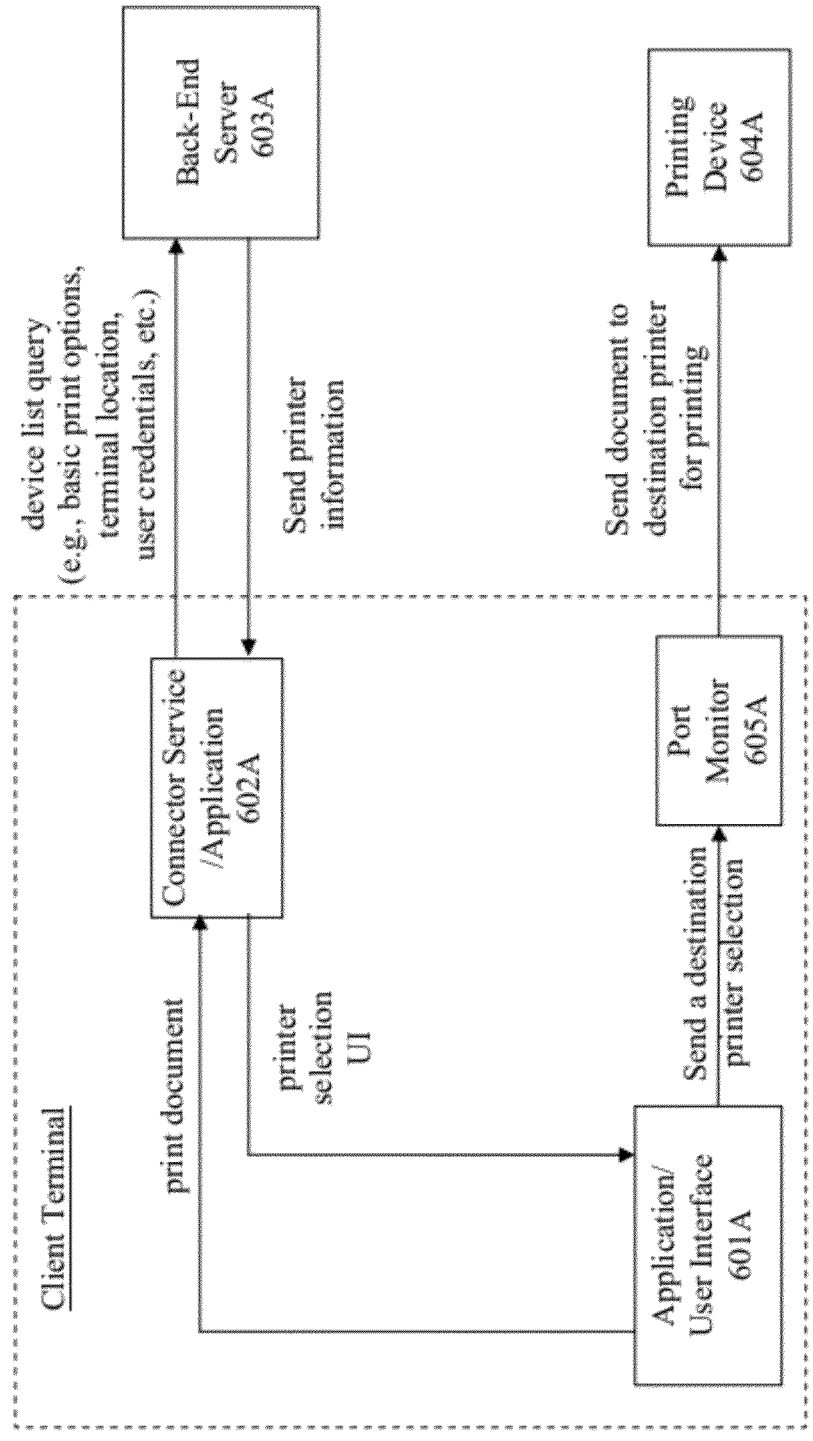
FIG. 6A shows a block diagram of a system, according to an exemplary embodiment.
Figure 6B:
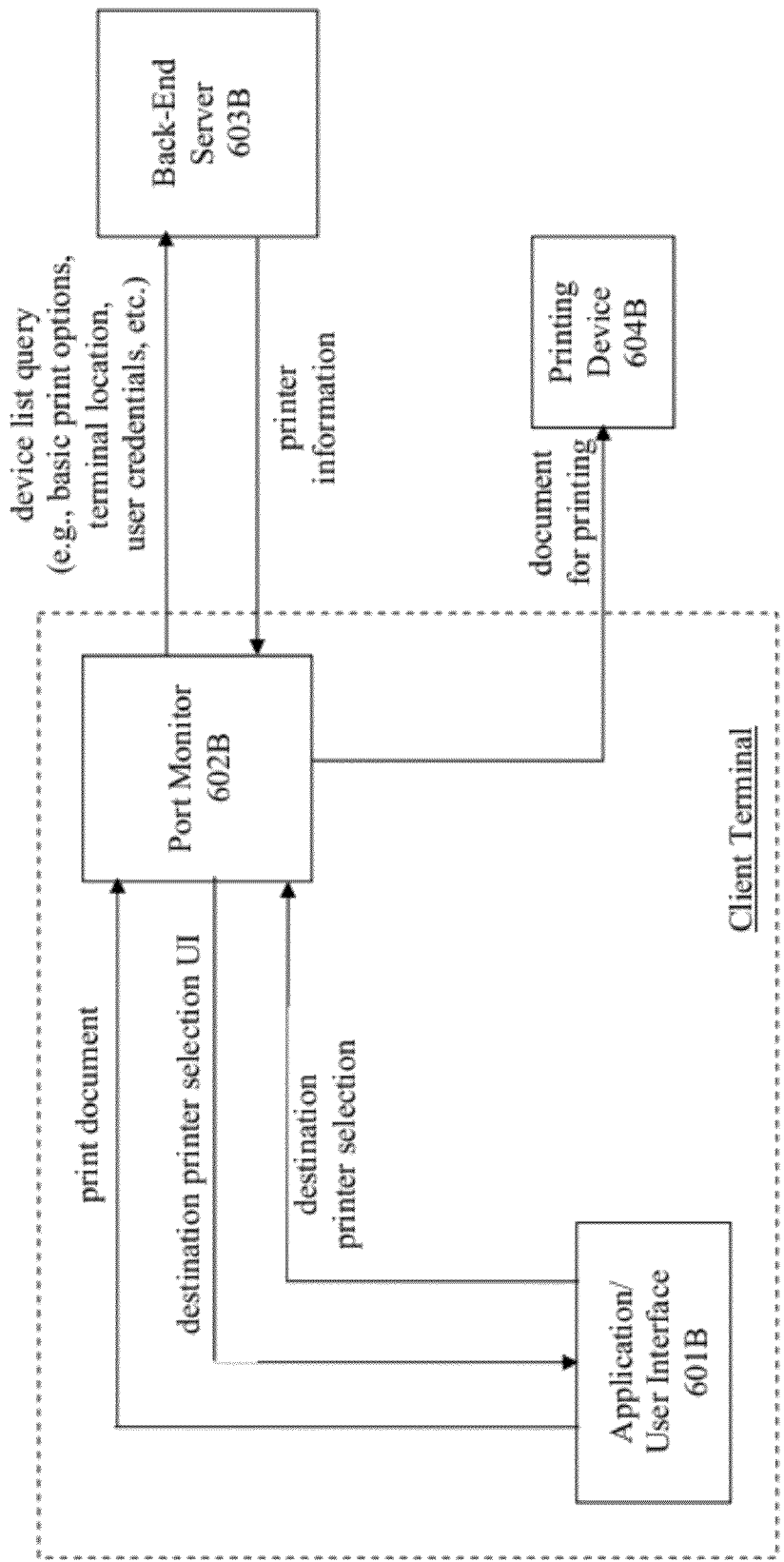
FIG. 6B shows a block diagram of a system, according to another exemplary embodiment.

The steps in the flow chart of FIG. 5 are illustrated by arrows shown in the block diagram of FIGS. 6A and 6B.

As shown in FIG. 6A, a connector service/application (which is described in greater detail with reference to FIGS. 7A and 7B), in an exemplary embodiment, may access the back-end server 603A to retrieve printer information and present a map or list of available printers to the user via the client terminal (indicated by the dotted line). Upon user selection of a destination printer, device data corresponding to the destination printer is sent, along with the print job, to the port monitor 605A, and the port monitor 605A sends the print job to the destination printer (i.e. the printing device 604A).

In another exemplary embodiment (not shown in FIG. 6A), after user selection of a destination printer, the back-end server 603A may be queried again for a network address of the destination printer, and the network address is used by the port monitor 605A to send the print job to the destination printer (i.e. the printing device 604A).

As shown in FIG. 6B, a port monitor (which is described in greater detail with reference to FIGS. 8A and 8B), in an exemplary embodiment, may access the back-end server 603B to retrieve printer information and present a map or list of available printers to the user via the client terminal (indicated by the dotted line). Upon user selection of a destination printer, the port monitor 605A sends the print job to the destination printer (i.e. the printing device 604A).

In another exemplary embodiment (not shown in FIG. 6B), after user selection of a destination printer, the back-end server 603A may be queried again for a network address of the destination printer, and the network address is used by the port monitor 605A to send the print job to the destination printer (i.e. the printing device 604A).

The implementation of the steps shown in FIGS. 5, 6A and 6B are further discussed below with reference to the examples of FIGS. 7 and 8.

In an exemplary embodiment, the printer interface DLL (discussed in the Background section of the present application) provides, in addition to printer configuration options (such as paper, tray and font selection), a user interface for displaying a map or list of available printing devices via the connector service/application, as shown in FIG. 7B. Such an embodiment is further discussed below with reference to FIG. 7A.

FIG. 7A shows a schematic representation of a workflow within the system shown in FIG. 6A, in an exemplary embodiment.

When a user pushes a print button in an application (e.g., Microsoft Word), the application initiates a print request by displaying a printer selection screen to the user through the printer selection user interface (step S701). The printer selection user interface displays (for example, upon activation of a printer properties button) a printer properties screen through the printer driver user interface (step S702). Upon activation of a search button on the printer properties screen, the printer driver user interface sends a printer search request to a connector service/application (a component which provides a communication link between the printer interface DLL and a back-end server) (step S703). The connector service/application then connects to the back-end server and sends a query for printing device information (step S704).

As discussed herein with reference to FIG. 5, such a device list query may be submitted to the back-end server using HTTP, HTTPS, SOAP or REST.

In response to the submission of the device list query by the connector service/application, the back-end server sends printing device information and/or map images including location information of the printing devices back to the connector service/application (step S705). For example, the device map/list sent back to the connector service/application may be in XHTML, HTML, XML, CSS, image format, or any combination thereof.

Figure 6C:
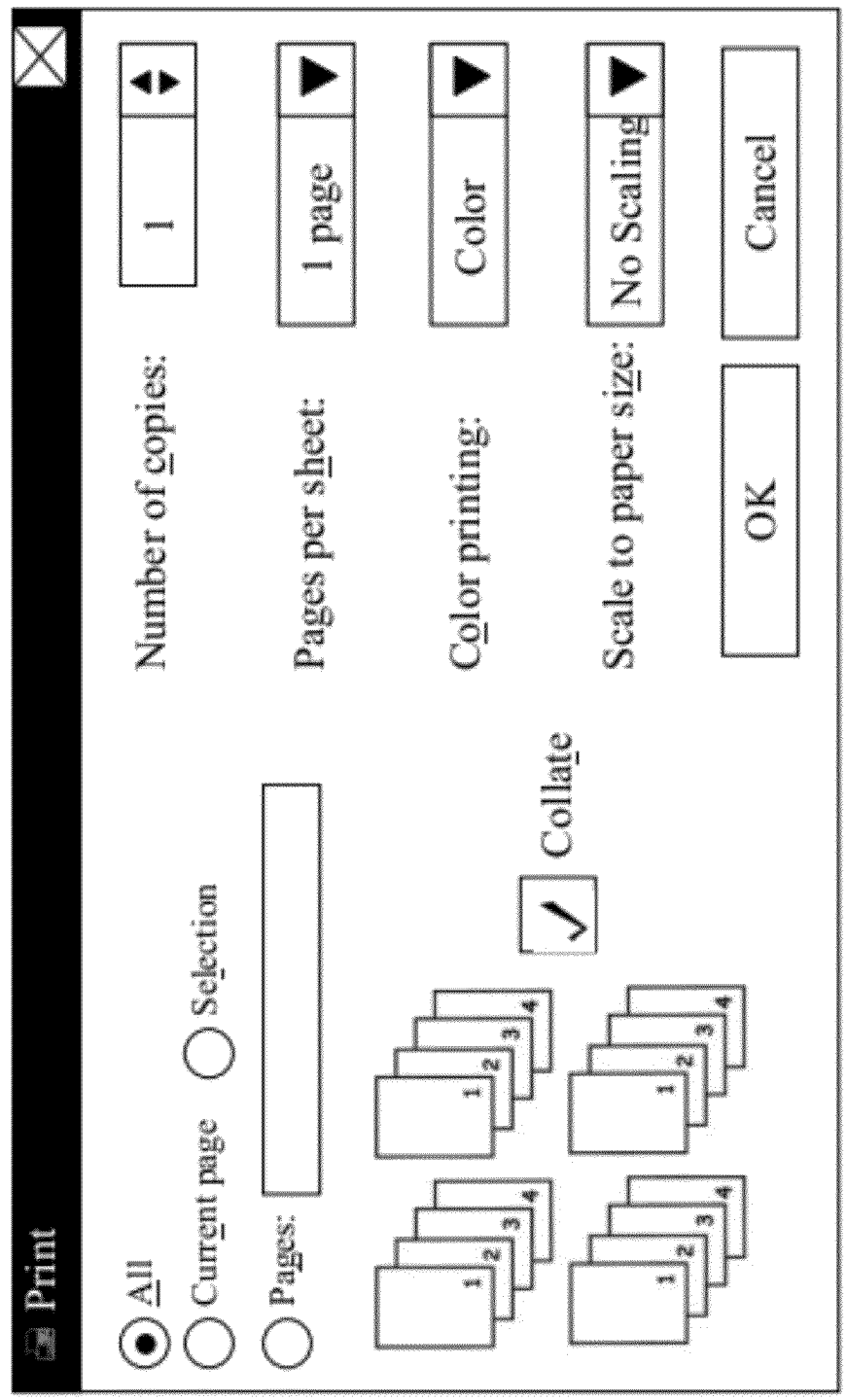
FIG. 6C shows an example of a screen for collecting user input of basic print options, according to an exemplary embodiment.

As discussed herein with reference to FIG. 5, the request for printing device information can contain the location information of the user terminal (e.g., plain text or GPS coordinates), the network address of the user terminal, print options specified by the user (FIG. 6C), or the login/profile information of the user, and such information can be utilized to determine the type of printers to which the user might prefer to submit print requests. For example, the map or list of printing devices provided to the user preferably contains only those printing devices that are accessible by the user as well as support the basic print options specified by the user. For example, if the print options shown in FIG. 6C are submitted, the printing devices included in the map or list should at least be capable of printing in color.

Using the printing device information and the map images retrieved from the back-end server, the connector service/ application displays a map or list of available printing devices (in a destination printer select dialog box) to the user through a connector user interface (step S706). For example, the destination printer select dialog box displayed through the connector user interface may be displayed in an XHTML or HTML viewer.

The user selects a destination printing device from the map or list of available printing devices, and the connector service/application receives the user selection of the printing device through the connector user interface (step S707).

As discussed herein with reference to the example of FIG. 6A, an exemplary configuration of a list of printing devices is shown in FIG. 9A, and an exemplary configuration of a map of printing devices is shown in FIG. 9B. In addition to these examples, the printer selections screen can display the available printing devices in other forms, such as a tree view, wherein the user can arrive at a desired printer by traversing down the tree.

After the user selection of a destination printing device is received, the destination printing device information is sent back through the printer driver user interface (step S708) and the printer selection user interface (step S709). Then, the application sends the print request along with a print job to the destination printing device upon confirmation of the user via the printer selection screen (step S710). The port monitor receives the print job sent by the application and sends the print job to the specified destination printing device (step S711). The printing status is then reported back to the port monitor by the destination printing device (step S712).

The steps shown in FIG. 7A are again illustrated in FIG. 7B using a block diagram. The arrows in FIG. 7B indicate a flow of information among the various elements shown in the example of FIG. 7B. In the exemplary embodiment shown in FIG. 7B, the printer interface DLL 701, connector service/application 702 and destination printer select dialog box 704 (all of which are part of a client terminal 705, as indicated by the dotted line) interact with the back-end server 703 in a manner similar to that between the client 201 and the server 202 of FIG. 2A (and that between the terminals and the back-end servers of FIGS. 2B-2E).

Figure 8A:
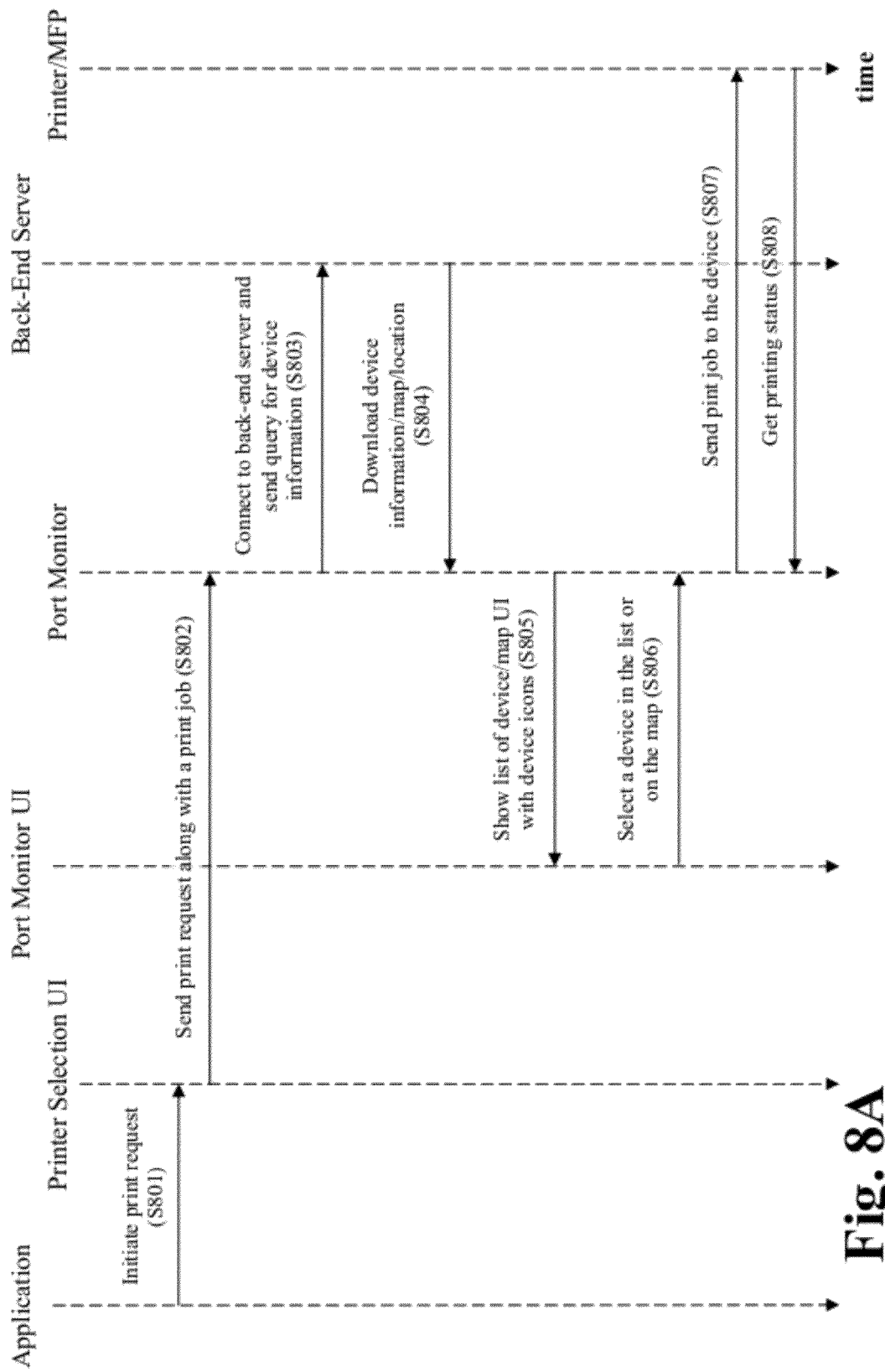
FIG. 8A shows a schematic representation of a workflow within the system of FIG. 6B, in another exemplary embodiment.

FIG. 8A shows a schematic representation of a workflow within the system shown in FIG. 6B, in another exemplary embodiment.

When a user pushes a print button in an application (e.g., Microsoft Word), the application initiates a print request by displaying a printer selection screen to the user through the printer selection user interface (step S801). The application submits a print job to the destination printing device upon confirmation of the user (e.g., by pressing the OK button) via the printer selection screen (step S802). The port monitor, upon receiving the print job and recognizing that the destination printing device has not yet been specified, connects to a back-end server and sends a query for printing device information (step S803).

As discussed herein with reference to FIG. 5, such a device list query may be submitted to the back-end server using HTTP, HTTPS, SOAP or REST.

In response to the submission of the device list query by the port monitor, the back-end server sends printing device information and/or map images including location information of the printing devices back to the port monitor (step S804). For example, the device map/list sent back to the port monitor may be in XHTML, HTML, XML, CSS, image format, or any combination thereof.

As discussed herein with reference to the example of FIG. 5, the request for printing device information can contain the location information of the user terminal (e.g., plain text or GPS coordinates), the network address of the user terminal, print options specified by the user (FIG. 6C), or the login/profile information of the user, and such information can be utilized to determine the type of printers to which the user would like to submit print requests. For example, the map or list of printing devices provided to the user preferably contains only those printing devices that are accessible by the user as well as support the basic print options specified by the user. For example, if the print options shown in FIG. 6C are submitted, the printing devices included in the map or list should at least be capable of printing in color.

Using the printing device information and/or the map images retrieved from the back-end server, the port monitor displays a map or list of available printing devices (in a destination printer select dialog box) to the user through a port monitor user interface (step S805). For example, the destination printer select dialog box displayed through the port monitor user interface may be displayed in an XHTML or HTML viewer.

The user selects a printing device from the map or list of available printing devices, and the port monitor receives the user selection of the printing device through the port monitor user interface (step S806).

As discussed herein with reference to the example of FIG. 6B, an exemplary configuration of a list of printing devices is shown in FIG. 9A, and an exemplary configuration of a map of printing devices is shown in FIG. 9B. In addition to these examples, the printer selections screen can display the available printing devices in other forms, such as a tree view, wherein the user can arrive at a desired printer by traversing down the tree.

After the user selection of the printing device is received, the port monitor sends the print job to the destination printing device (step S807). The printing status is then reported back to the port monitor by the destination printing device (step S808).

Figure 8B:
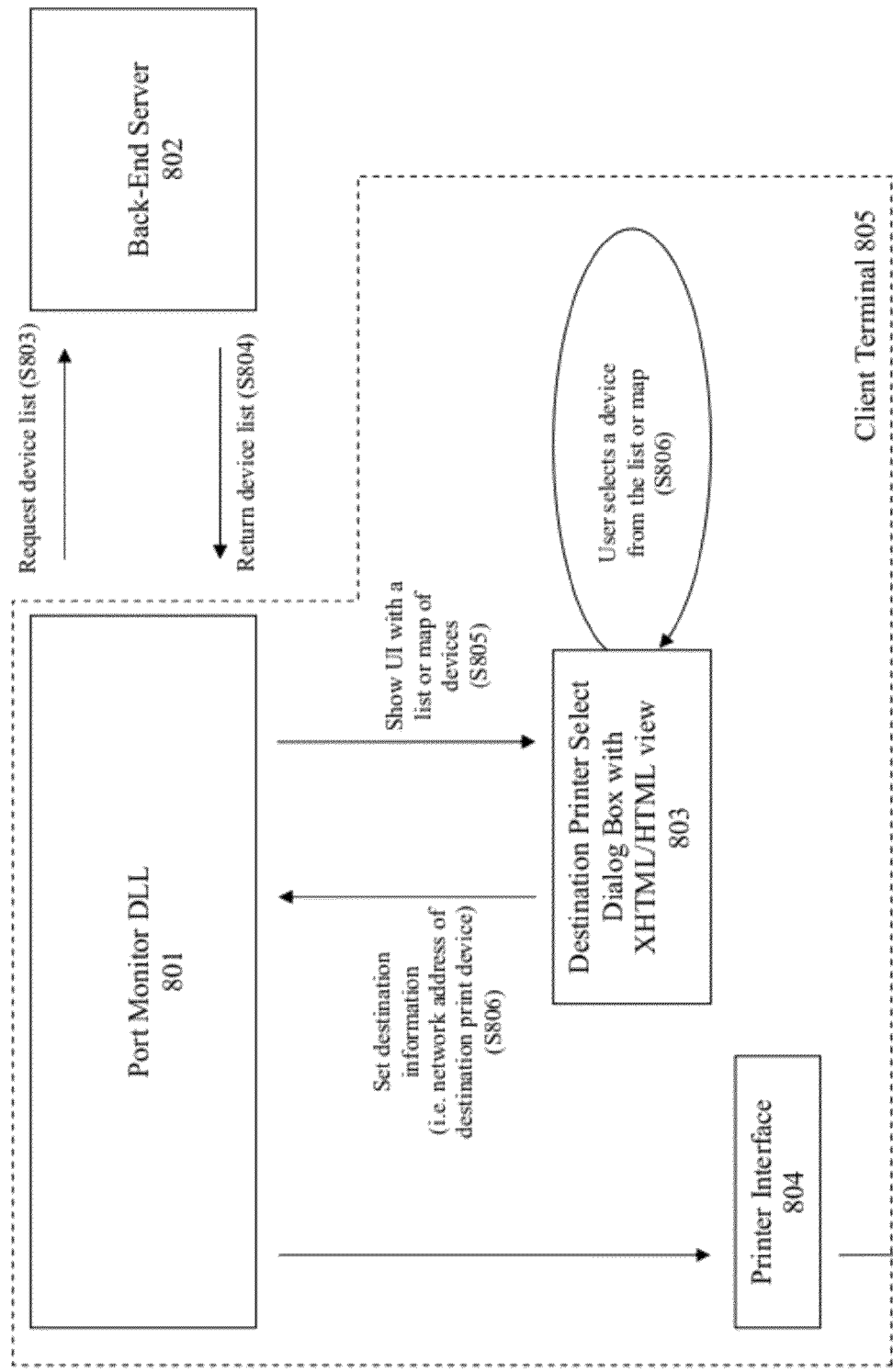
FIG. 8B shows a block diagram illustrating a workflow within the system of FIG. 6B, according to another exemplary embodiment.

The steps shown in FIG. 8A are again illustrated in FIG. 8B using a block diagram. The arrows in FIG. 8B indicate a flow of information among the various elements shown in the example of FIG. 8B. In the exemplary embodiment shown in FIG. 8B, the port monitor DLL 801, destination printer select dialog box 803 and printer interface 804 (all of which are part of a client terminal 805, as indicated by the dotted line) interact with the back-end server 802 in a manner similar to that between the client 201 and the server 202 of FIG. 2A (and that between the terminals and the back-end servers of FIGS. 2B-2E). After the destination printer is selected by the user, the print job is submitted to the destination printer (i.e. printing device 806).

The printer interface 804 (e.g., the kernel-mode port driver stack shown in FIG. 1A), receives information regarding the network address of the destination printer and the type of the port to which the destination printer is connected, and accesses the port hardware to transmit the print job to the destination printer. Various network protocols such as Transmission Control Protocol/Internet Protocol (TCP/IP), Line Printer Remote (LPR) protocol, Internet Printing Protocol (IPP) or Server Message Block (SMB) may be used (e.g., by the port monitor DLL 801) to submit a print job to the destination printer over a network or the Internet. Different network protocols may use different ports and port settings (e.g., similar to those configured in Microsoft Windows).

The aforementioned embodiments and examples are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

Further, it should be apparent to one skilled in the art that such elements can be implemented in a single device or distributed across a network or over a transmission channel, or implemented as hardware or software or a combination.

Additional variations may be apparent to one of ordinary skill in the art from reading U.S. patent application Ser. No. 11/713,125, filed Mar. 1, 2007 and entitled "SYSTEM AND METHOD FOR PRINTER DRIVER DISTRIBUTION WITH SEARCHABLE MAP DATABASE", the entire contents of which are incorporated herein by reference.

What is claimed is:

1. A system for dynamically providing print services without a priori user knowledge of available print devices, said system comprising:
    a back-end printer data apparatus that maintains printer data for a plurality of print devices in a device database that stores device data; and
    a print-enabled terminal apparatus comprises at least one processor configured to execute computer-executable instructions in a non-transitory computer-readable medium to comprise:
        a print user interface part providing a print options user interface for specifying basic print options for a user-specified print job;
        a connector part formulating a device list query based on the basic print options selected by a user for the user-specified print job through the print options user interface, and outputting the device list query to the back-end printer data apparatus, receiving from the back-end printer data apparatus in response to the device list query, device information of specific print devices having corresponding data, in the device database, that match the device list query, and returning a list of the specific print devices to the print user interface part, wherein
            the print user interface part of the print-enabled terminal apparatus provides, based on the list of the specific print devices returned by the connector part, a print device selection user interface for user selection of a print device from the specific print devices on the list returned by the connector part, for the user-specified print job, and
            the connector part of the print-enabled terminal apparatus, in response to the user selection of the selected print device through the print device selection user interface, sets network information based on the device data of the selected print device; and
        a printer interface part formatting the user-specified print job based on the device data of the selected print device, and transmitting the formatted print job to the selected print device based on the network information.

2. The system of claim 1, wherein
    the print options user interface provided by the print user interface part of the print-enabled terminal apparatus includes a location specifying part for user specification of text-formed location information,
    the device list query formulated by the connector part of the print-enabled terminal apparatus includes a location term that includes the text-formed location information, and
    the device information returned by the back-end printer data apparatus to the connector part of the print-enabled terminal apparatus corresponds to print devices that are determined by the back-end printer data apparatus to match the location term in the device list query from the connector part of the print-enabled terminal apparatus.

3. The system of claim 2, wherein
    the connector part of the print-enabled terminal apparatus receives from the back-end printer data apparatus in response to the device list query, map data, in addition to the device information of the specific print devices that match the device list query, corresponding to the location term in the device list query, and
    the print device selection user interface provides a graphical map including selectable indicators corresponding to the respective specific print devices on the list returned by the connector part, on the graphical map.

4. The system of claim 1, wherein
    the device list query formulated by the connector part of the print-enabled terminal apparatus includes a location term that indicates location of the print-enabled terminal apparatus, determined by a Global Positioning System (GPS) receiver or another location determining device, and
    the device information returned by the back-end printer data apparatus to the connector part of the print-enabled terminal apparatus corresponds to print devices that are determined, by the back-end printer data apparatus, to be within a specified range of the location of the print-enabled terminal apparatus, as specified by the location term in the device list query from the connector part of the print-enabled terminal apparatus.

5. The system of claim 4, wherein
    the connector part of the print-enabled terminal apparatus receives from the back-end printer data apparatus in response to the device list query, map data, in addition to the device information of the specific print devices that match the device list query, corresponding to the location term in the device list query, and
    the print device selection user interface provides a graphical map including selectable indicators corresponding to the respective specific print devices on the list returned by the connector part, on the graphical map.

6. The system of claim 1, wherein
    the connector part of the print-enabled terminal apparatus outputs user credential information along with the device list query to the back-end printer data apparatus, and
    the device information returned by the back-end printer data apparatus to the connector part of the print-enabled terminal apparatus corresponds to print devices that are determined, by the back-end printer data apparatus based on the user credential information, to be authorized to be used.

7. The system of claim 1, wherein
    the connector part of the print-enabled terminal apparatus outputs user credential information along with the device list query as a data access request to the back-end printer data apparatus, and
    the back-end printer data apparatus authenticates the data access request based on the user credential information, and returns the device information to the connector part of the print-enabled terminal apparatus, only if the data access request is authenticated.

8. The system of claim 1, wherein the printer data maintained in the device database by the back-end printer data apparatus includes device drivers for the plurality of respective print devices.

9. The system of claim 1, wherein the print options user interface provided by the print user interface part of the print-enabled terminal apparatus includes a search part for user specification of text-formed keyword information, the device list query formulated by the connector part of the print-enabled terminal apparatus includes a keyword term that includes the text-formed location information, and the device information returned by the back-end printer data apparatus to the connector part of the print-enabled terminal apparatus corresponds to print devices that are determined by the back-end printer data apparatus to match the keyword term in the device list query from the connector part of the print-enabled terminal apparatus.

10. A computer program product including computer-executable instructions embodied in a non-transitory computer-readable medium, for dynamically providing print services without a priori user knowledge of available print devices, said computer program product comprising:

a print user interface part providing to a user terminal a print options user interface for specifying basic print options for a user-specified print job;

a connector part to formulate a device list query based on the basic print options selected by a user for the user-specified print job through the print options user interface, output the device list query to a back-end printer data maintaining device that maintains printer data in a device database, receive from the back-end printer data maintaining device in response to the device list query, device information of specific print devices having corresponding data in the device database that match the device list query, and return a list of the specific print devices to the print user interface part, wherein the print user interface part provides, based on the list of the specific print devices returned by the connector part, a print device selection user interface to the user terminal, for user selection of a specific print device from the list of the specific print devices that match the basic print options specified through the print options user interface, for the user-specified print job, and the connector part, in response to the user selection of the specific print device through the print device selection user interface, sets network information based on the device data of the specific print device; and a printer interface part formatting the user-specified print job based on the device data of the specific print device, and transmitting the formatted print job to the specific print device based on the network information.

11. The computer program product of claim 10, wherein the print options user interface provided by the print user interface part to the user terminal includes a location specifying part for user specification of text-formed location information, and the device list query includes a location term that includes the text-formed location information.

12. The computer program product of claim 11, wherein the connector part receives from the back-end printer data maintaining device in response to the device list query, map data, in addition to the device information of the specific print devices that match the device list query, corresponding to the location term in the device list query, and the print device selection user interface provides a graphical map including selectable indicators corresponding to the respective specific print devices on the list returned by the connector part, on the graphical map.

13. The computer program product of claim 10, wherein the device list query formulated by the connector part includes a location term that indicates a location of the user terminal, as determined by a Global Positioning System (GPS) receiver or another location determining device, and the device information received by the connector part from the back-end printer data maintaining device corresponds to print devices that are determined, by the back-end printer data maintaining device, to be within a specified range of the location of the user terminal, as specified by the location term in the device list query.

14. The computer program product of claim 13, wherein the connector part receives from the back-end printer data apparatus in response to the device list query, map data, in addition to the device information of the specific print devices that match the device list query, corresponding to the location term in the device list query, and the print device selection user interface provides a graphical map including selectable indicators corresponding to the respective specific print devices on the list returned by the connector part, on the graphical map.

15. The computer program product of claim 10, wherein the network information set by the connector part based on the device data of the selected print device includes port type and network address of the selected print device, for transmitting the print job to the selected print device.

16. A method for dynamically providing print services without a priori user knowledge of available print devices, said method comprising:

maintaining printer data for a plurality of print devices in a device database that stores device data;

providing a print options user interface on a user terminal, for specifying basic print options for a user-specified print job;

outputting a device list query formulated based on the basic print options selected by a user for the user-specified print job through the print options user interface, to a back-end printer data apparatus;

receiving from the back-end printer data apparatus in response to the device list query, device information of specific print devices having corresponding data, in the device database, that match the device list query, and returning a list of the specific print devices;

providing a print device selection user interface, based on the list of the specific print devices having corresponding data in the device database that match the device list query, for user selection of a print device from the specific print devices, for the user-specified print job;

setting network information based on the device data of the selected print device, in response to the user selection of the selected print device through the print device selection user interface; and transmitting the print job to the selected print device based on the network information.

* * * * *